United States Patent
Lewis et al.

(10) Patent No.: US 6,675,872 B2
(45) Date of Patent: Jan. 13, 2004

(54) HEAT ENERGY DISSIPATION DEVICE FOR A FLYWHEEL ENERGY STORAGE SYSTEM (FESS), AN FESS WITH SUCH A DISSIPATION DEVICE AND METHODS FOR DISSIPATING HEAT ENERGY

(75) Inventors: Eric Lewis, Newton, MA (US); Todd A. Ebert, Brookline, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 10/243,359

(22) Filed: Sep. 12, 2002

(65) Prior Publication Data

US 2003/0066381 A1 Apr. 10, 2003

Related U.S. Application Data

(60) Provisional application No. 60/322,767, filed on Sep. 17, 2001.

(51) Int. Cl.[7] ............................................. F28D 19/00
(52) U.S. Cl. ....................... 165/10; 165/104.21; 165/45
(58) Field of Search ........................ 165/10, 45, 104.21, 165/104.26, 185, 86

(56) References Cited

U.S. PATENT DOCUMENTS

| | | | | |
|---|---|---|---|---|
| 3,765,480 A | * | 10/1973 | Fries | ............................ 165/86 |
| 3,855,795 A | * | 12/1974 | Noble et al. | ................... 60/524 |
| 4,921,043 A | | 5/1990 | Ghiraldi | ....................... 165/32 |
| 6,542,365 B2 | * | 4/2003 | Inoue | .......................... 361/699 |
| 2003/0000683 A1 | * | 1/2003 | Mast et al. | ............. 165/104.26 |
| 2003/0056936 A1 | * | 3/2003 | Lindemuth et al. | ............ 165/45 |

* cited by examiner

*Primary Examiner*—Terrell McKinnon
(74) *Attorney, Agent, or Firm*—David G. Conlin; William J. Daley, Jr.; Edwards & Angell LLP

(57) ABSTRACT

Featured are a device, system and method for dissipating at least some heat energy generated by one or more heat generating components of a flywheel energy storage system (FESS). The method includes providing a heat pipe member, having first and second ends, and a heat dissipating member thermally engaged with the heat pipe member second end and configured to transfer heat energy therefrom. The method also includes thermally engaging the heat pipe member first end to the FESS so that at least some heat energy generated by the FESS heat generating component is communicated to the first end and thence through the heat pipe member to the heat dissipating member. Further, the method includes locating the heat dissipating member in a heat sink remote from the FESS.

52 Claims, 13 Drawing Sheets

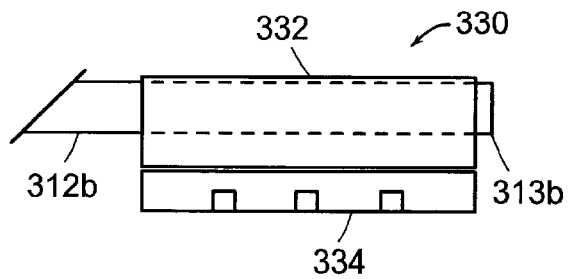
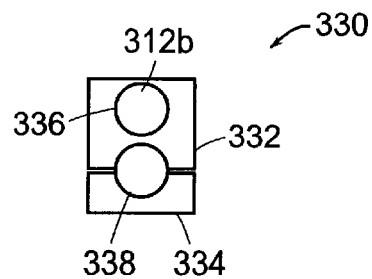
FIG. 3A  FIG. 3B
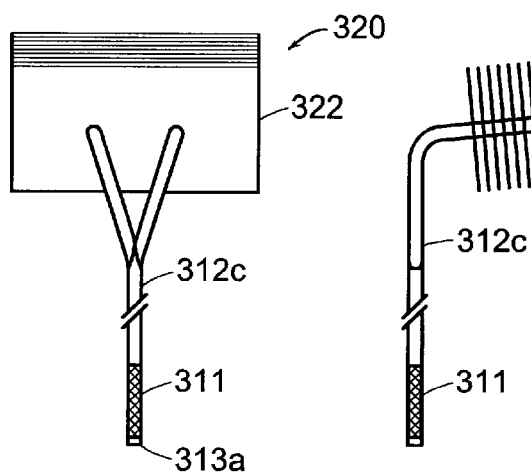
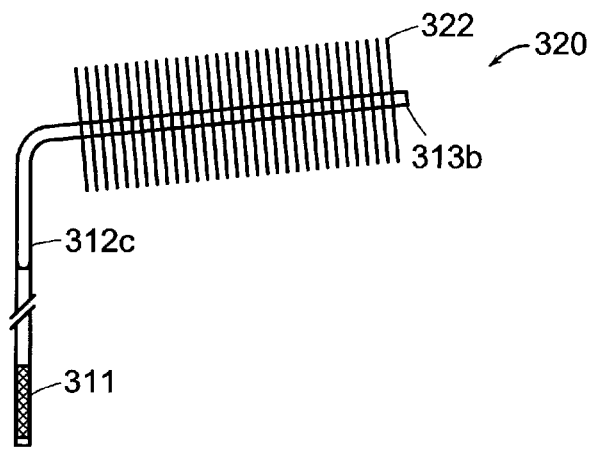
FIG. 4A  FIG. 4B
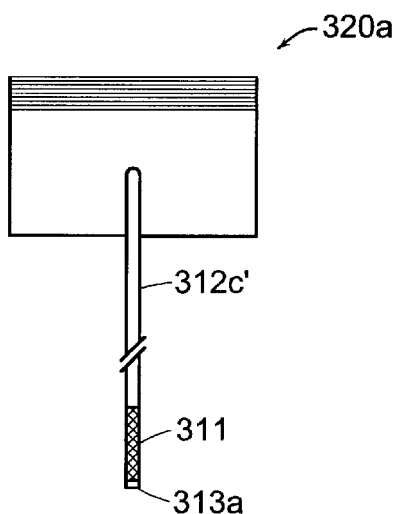
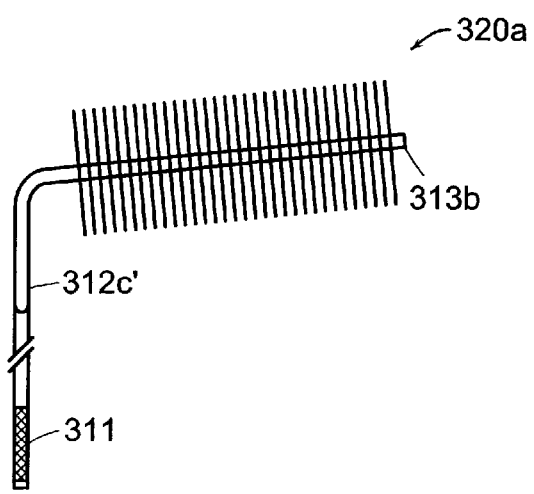
FIG. 4C  FIG. 4D

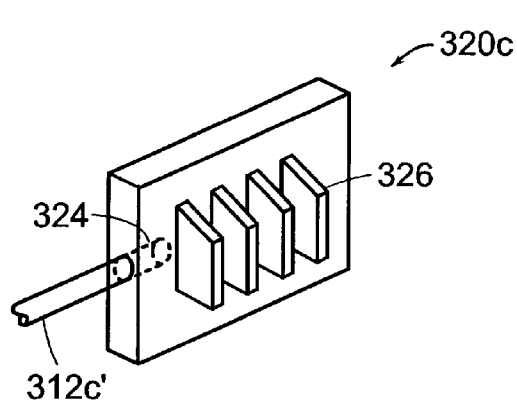
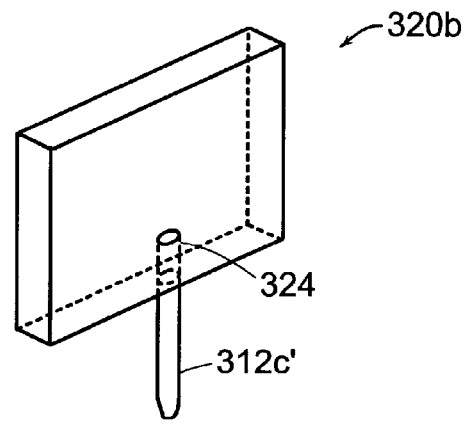
FIG. 4F    FIG. 4E
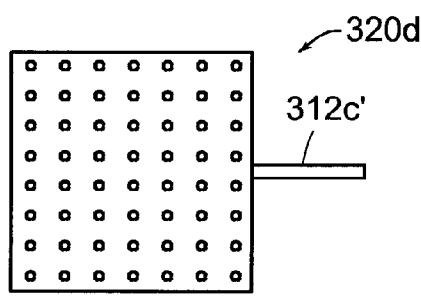
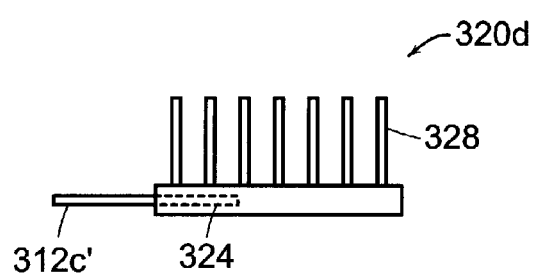
FIG. 4G    FIG. 4H

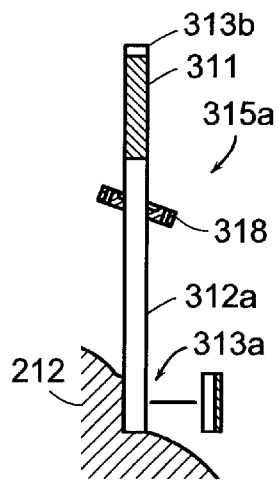
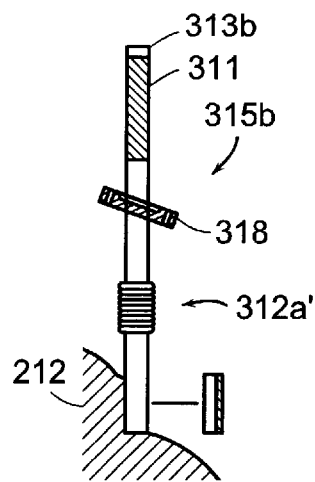
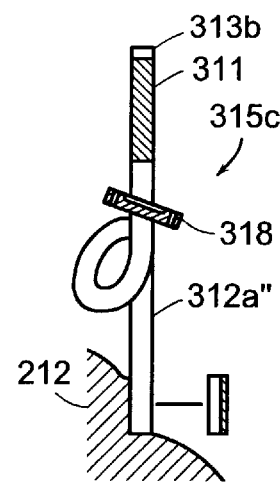
FIG. 9A  FIG. 9B  FIG. 9C
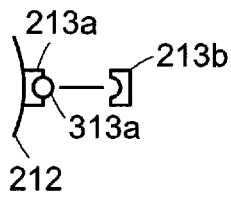
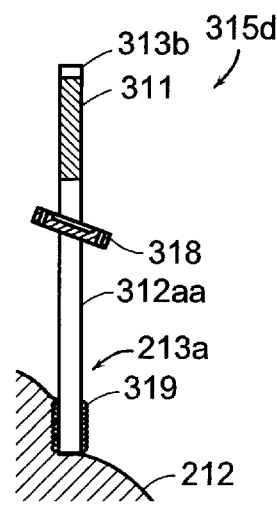
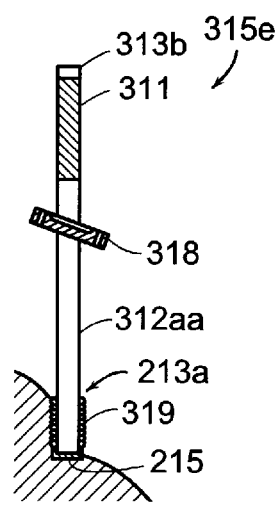
FIG. 9D  FIG. 9E  FIG. 9F

HEAT ENERGY DISSIPATION DEVICE FOR A FLYWHEEL ENERGY STORAGE SYSTEM (FESS), AN FESS WITH SUCH A DISSIPATION DEVICE AND METHODS FOR DISSIPATING HEAT ENERGY

This application claims the benefit of U.S. Provisional Application Serial No. 60/322,767 filed Sep. 17, 2001 the teachings of which are incorporated herein in their entirety by reference.

FIELD OF INVENTION

The present invention relates generally to flywheel energy storage systems, and more particularly to devices, and methods for dissipating the heat energy developed during operation of such flywheel energy storage systems, which systems use a vacuum environment to reduce windage losses.

BACKGROUND OF THE INVENTION

The ability of flywheels to accept and release energy over relatively short time periods has been known for many years and energy storage flywheels have been used, or proposed for use, in a variety of applications. Such proposed and actual use applications include motor vehicle applications and stand alone supplemental energy sources.

There is shown in FIG. 1 a simplified view of a conventional flywheel energy storage system 100 used for storing kinetic energy. The conventional flywheel system 100 includes a flywheel assembly 104 disposed in a flywheel housing 102. Further, the flywheel housing is configured and arranged so such flywheel assemblies 104 are run under vacuum, in order to avoid drag on the flywheel. The systems are evacuated with standard vacuum pumps, e.g. turbo pumps, and then sealed, preferably by pinching off and then fusing the end of a copper tube, thus forming an all metal seal, which is impervious even to argon. The materials that make up the flywheel system, however, may entrain or evolve substantial quantities of materials which may be released within the system when under a vacuum, thus causing a reduction of the vacuum during operation. To partially deal with that problem, a drag pump 106 for example, is incorporated into the flywheel assembly 104 for pumping gases from the flywheel housing 102 into a separate gas storage chamber 108.

The typical flywheel assembly 104 includes a flywheel, a shaft to which is secured the flywheel and one or more bearings or bearing assemblies that rotatably support the shaft. Traditionally, flywheels have been made of metal, e.g., high strength steel. More recently, flywheels have been fabricated using fiber composite materials, e.g., fiberglass or carbon wound with a resin binder, thereby making flywheels that are lighter in weight and capable of operating at higher speeds than the traditional metal flywheel assemblies operate.

Because the rotatable supporting of the rotating flywheel results in the production of heat energy in the bearings or bearing assemblies, as well as the production of heat energy by a number of other components of the conventional flywheel energy storage system 100 such as for example, the motor; the flywheel assembly 104 as well as the operational life of the flywheel energy storage system 100 is dependent upon the ability of the flywheel energy storage system to dissipate the heat energy being developed. One conventional technique to dissipate the heat energy involves the use of the supporting structure(s) for the flywheel, motor and the bearings or bearing assemblies as a thermal conduction path to conduct the heat energy of the bearings to the flywheel housing 102. The heat energy is thence communicated to the external environment or heat sink via the flywheel housing 102. If heat energy cannot be dissipated in the desired amounts to the heat sink, then the component temperature within the flywheel energy storage system 100 will not be maintained within optimal or desired limits thereby shorting the operational life of these components and thus reducing the operational availability of the flywheel energy storage system.

In some applications, such as when the flywheel energy storage system 100 is being used as an uninterruptible power supply (UPS), the flywheel energy storage system is located below grade (i.e., underground). In this way, a structural failure of the system or its components, no matter how unlikely, would be contained below grade. This arrangement also makes siting of the flywheel energy storage system 100 easier because the space above-ground does not have to be dedicated or reserved for the system. In addition, the end user's cabinet or structure does not have to be designed around the physical space requirements for the flywheel energy storage system. The physical space requirements for a conventional flywheel energy storage system would involve for example, a space area about 3 ft. high and about 2 ft. in diameter, which may be larger than the typical dimensions of an end user's cabinet.

One prior art technique for dissipating heat energy in such cases, involves providing a below grade structure, having a chamber in which is disposed the flywheel energy storage system 100. This structure also is configured so that the chamber is in fluid communication with the atmosphere, whereby heat energy generated by the flywheel energy storage system 100 is dissipated directly to atmosphere, which acts as the heat sink. This arrangement, however, requires the below grade structure to be configured or designed to include one or more above-grade or at grade openings that are sufficiently sized so there is a sufficient flow of air from within the chamber to the atmosphere and from atmosphere back into the chamber so a desired amount of heat energy is thereby dissipated. Such openings, however, also must be configured and designed to provide a barrier to infestation, such as by insects or animals, or provide a barrier so as the openings do not form an attractive nuisance to children or people. Further, the openings have to be designed to preclude environmental effects, such as those caused by the weather or other natural causes, from affecting the operation of the flywheel energy storage system or shortening its operational life. Also, the structures forming the openings would involve considerations of siting (e.g., visible nuisances), which negate in part some of the perceived advantages of locating the flywheel energy storage system 100 below grade.

In another technique the structure forms a closed chamber where the heat energy dissipated from the flywheel energy storage system 100 into the closed chamber is ultimately communicated to the ground or soil surrounding the structure (i.e., earth, ground or soil comprises the heat sink. Alternatively, the flywheel energy storage system 100 is disposed in the ground or soil without a surrounding structure so the heat energy is dissipated from the storage system directly to the surrounding earth, ground or soil. The earth, ground or soil conditions in some cases, however, do not provide good heat conductivity, consequently there is poor heat energy dissipation into the soil. In such a case, the desired or needed amounts of the heat energy being generated by the flywheel energy storage system cannot be effectively dissipated into the earth, ground or soil. Consequently, component temperatures cannot be maintained at optimal values, thereby shortening the expected operational life of the component and the mean-time-between-failure (MTBF) for the flywheel energy storage system. Thus, as a practical matter this technique is limited for only those cases where earth, ground or soil conditions are optimal for the dissipation of such heat energy. Consequently, in such cases, the chamber of the below grade structure is put into fluid communication with atmosphere as described above.

It thus would be desirable to provide a new device, apparatus or method for dissipating heat energy of a flywheel energy storage system (FESS) to the surrounding environment particularly when the capabilities of the heat sink proximal the FESS are not optimal to dissipate such heat energy. It would be particularly desirable to provide such a device, apparatus and method whereby at least some of the generated heat energy is communicated to a second heat sink, the second heat sink being remote from the FESS and having desirable heat transfer characteristics (e.g., heat transfer characteristics better than those of the heat sink proximal the FESS). It also would be particularly desirable to utilize such a second heat sink as a source of useable heat energy or to provide a mechanism for storing peak heat energy outputs that can be dissipated therefrom over time. Such heat energy dissipation devices or apparatuses preferably would be simple in construction and such methods would not require highly skilled users to utilize or install the device or apparatus.

SUMMARY OF THE INVENTION

The present invention features a device, system and method for dissipating at least some heat energy being generated by one or more heat generating components of a flywheel energy storage system. Such a device, system and method more particularly provides a mechanism by which such heat energy is dissipated to a heat sink that is remote from the location of the flywheel energy storage system and which heat sink is capable of continuously receiving and conducting such heat energy. In this way, the flywheel energy storage system (FESS) can be located at a location that is desirable from the standpoint of interfacing the FESS with other components to which the FESS provides energy, while at the same time providing a mechanism for transferring at least some heat energy from the FESS to a heat sink that is remote therefrom, which heat sink exhibits the desired heat transfer properties for dissipating heat energy. The amount of heat energy being dissipated to this remote heat sink is sufficient to maintain the operating temperature of the one or more FESS heat generating components at or below a given temperature value.

A heat dissipation method according to the present invention includes providing a heat pipe member, having first and second ends, and a heat dissipating member being thermally engaged with the heat pipe member second end and being configured to transfer heat energy therefrom. Such a heat pipe member includes a heat pipe, which is a heat transferring device having a sealed member, for example a sealed tubular member, with an inner lining of a wicklike capillary material and a small amount of a fluid in a partial vacuum. As is known to those skilled in the art, heat is absorbed at one end of the sealed member by vaporization of the fluid and this heat energy is released at the other end of the sealed member by condensation of the vapor. The condensate is returned to the "one end" via the capillary material so the absorption and release of heat energy is a continuing process.

The heat dissipation method also includes thermally engaging the heat pipe member first end to the flywheel energy storage system so that at least some heat energy being generated by the one or more FESS heat generating components, hereinafter the heat energy to be dissipated, is communicated to the first end and through the heat pipe member. Further, such method includes locating the heat dissipating member in a heat sink remote from the flywheel energy storage system, hereinafter remote heat sink. As indicated above, the remote heat sink is capable of receiving and conducting the heat energy to be dissipated from the heat dissipating member.

In specific embodiments, the heat sink in which the heat dissipating member is to be located is selected so the selected heat sink has different heat transfer characteristics from those of a heat sink that is proximal the flywheel energy storage system (i.e., a proximal heat sink). In more specific embodiments, the selected or remote heat sink comprises one of a fluid or a solid, where the fluid is one of a gas and a liquid. In yet an even more specific embodiment, the remote heat sink is the atmosphere, the earth or a body of water such as a pond, lake or the ocean. Even more specifically, the flywheel energy storage system is positioned so as to be below grade and the heat dissipating member is located above grade so that the heat energy to be dissipated is transferred from the heat dissipating member to atmosphere.

In other specific embodiments, thermally engaging the first end includes thermally engaging the heat pipe member first end to one of a portion of a housing or supporting structure of the flywheel energy storage system. The housing and/or supporting structure are thermally engaged with the one or more FESS heat generating components.

In alternative embodiments, a plurality of heat pipe members are provided, each of which is thermally coupled to the flywheel energy storage system. More particularly, the first end of each heat pipe member thermally engages one of the housing or supporting structure of the flywheel energy storage system. Alternatively, the heat pipe members are arranged so that at least one heat pipe member thermally engages the housing and/or at least another heat pipe member thermally engages the supporting structure. In yet another embodiment, a plurality of heat dissipating members are provided, one for each heat pipe member, where each of the heat pipe members thermally engages a corresponding one of the plurality of heat dissipating members.

There also is featured a heat dissipation device for a flywheel energy storage system including a heat pipe member having a first end and second end, a heat dissipating member thermally engaged to the heat pipe member second end and being configured to transfer heat energy therefrom. The heat pipe member first end is configured and arranged so as to thermally engage a portion of the flywheel energy storage system such that at least a portion of heat energy generated by one or more components thereof, the heat energy to be dissipated, is transferred to the heat pipe member and communicated from the first end to the second end. Further, a length of the heat pipe member is set so that the heat dissipating member is located in a heat sink that is remote from the flywheel energy storage system, hereinafter remote heat sink, the remote heat sink being capable of receiving and conducting the heat energy to be dissipated from the heat dissipating member. As to the characteristics of the remote heat sink, and other features of the heat dissipation device, reference shall be made to the foregoing discussion regarding the heat dissipation method of the present invention.

In alternative embodiments, the heat dissipation device includes a plurality of heat pipe members, where the first ends thereof thermally engage the flywheel energy storage system as described above. In more particular embodiments, the first end of each heat pipe member is configured so as to thermally engage one of a housing or supporting structure of the FESS, which housing or supporting structure is thermally coupled to the one or more heat generating components. In yet another particular embodiment, the heat dissipation device includes a plurality of heat dissipating members, one for each heat pipe member, where each heat pipe member thermally engages a corresponding one of the plurality of heat dissipating members.

Also featured is a flywheel energy storage system (FESS) including one or more heat generating components and a heat dissipation device as described above that is thermally coupled to the one or more heat generating components and the remote heat sink. In more particular embodiments, the FESS further includes one of a housing or supporting structure that is thermally coupled to the one or more heat generating components. In these particular embodiments, the heat dissipation device is thermally coupled to one of, or both of, the housing and the supporting structure. Alternatively, the FESS includes a plurality of heat dissipation devices, each being thermally coupled to the one or more heat generating components and the remote heat sink. In yet other embodiments, the heat dissipation device comprises a plurality of heat pipe members alone or in combination with a plurality of hest dissipating devices as described above.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIGS. 3A–B are a side view and an end view respectively of an illustrative heat pipe coupler;

FIGS. 4A–B are side and end views respectively of the heat dissipating member of the heat dissipation device according to one embodiment of the present invention;

FIGS. 4C–D are side and end views respectively of a first alternative embodiment of a heat dissipating member;

FIG. 4E is a perspective view of a second alternative embodiment of a heat dissipating member;

FIG. 4F is a perspective view of a third alternative embodiment of a heat dissipating member;

FIGS. 4G,H are plan and side views of a fourth alternative embodiment of a heat dissipating member;

FIGS. 9A–F are various side views illustrating various other techniques for securing the heat dissipation device according to the another aspect to internal structure of the FESS;

DESCRIPTION OF THE PREFERRED EMBODIMENT

Figure 1:
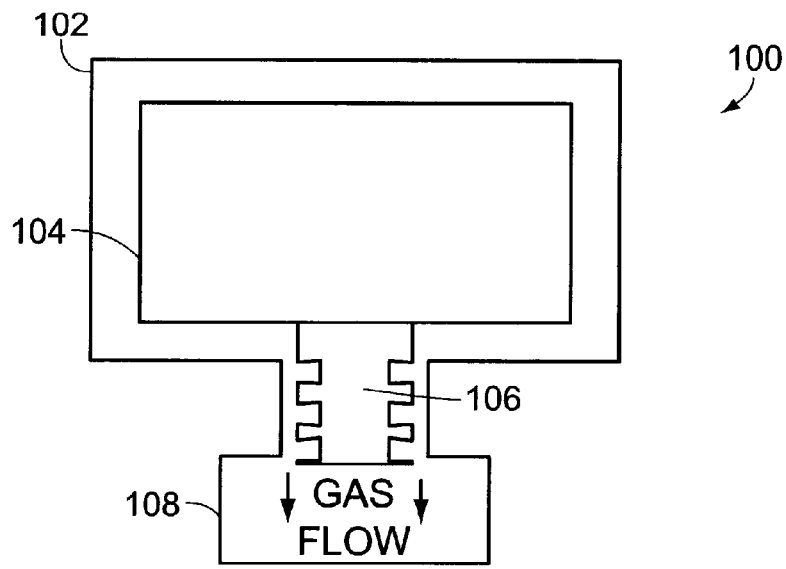
FIG. 1 is a simplified schematic view of a conventional flywheel energy storage system.
Figure 2:
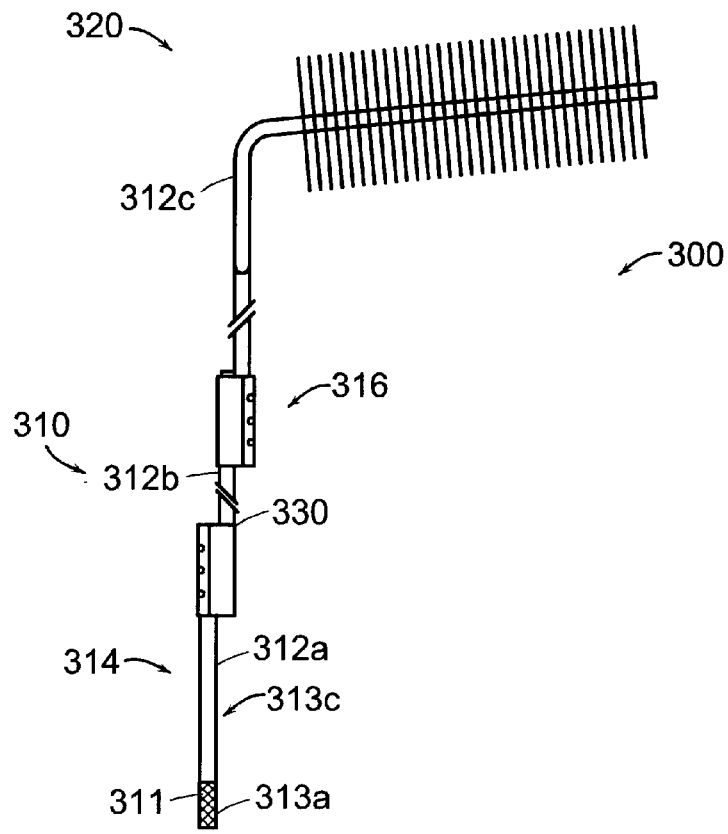
FIG. 2 is a side view of an exemplary embodiment of a heat dissipation device according to the present invention.

Referring now to the various figures of the drawing, wherein like reference characters refer to like parts, there is shown in FIG. 2 a side view of an exemplary embodiment of a heat dissipation device 300 according to the present invention, one or more of which are thermally coupled to structure of a flywheel energy storage system (FESS) 200 and to a remote heat sink 402. Reference also generally should be made to FIGS. 5–9 for features and structure of the FESS 200 as well as other elements referred to in the following discussion and not otherwise shown in FIG. 2. In the illustrated exemplary embodiment, the heat dissipation device 300 includes a heat-pipe member 310 that is thermally coupled to the structure of the FESS 200 using any of a number of techniques and/or mechanisms known to those skilled in the art and a heat dissipating member 320 that is thermally coupled to the remote heat sink 402. Some exemplary techniques and/or mechanisms for thermally coupling are more particularly described hereinafter in the discussion for FIGS. 5–9.

The heat pipe member 310 includes a heat pipe 312 which is a well known heat transfer device that comprises a sealed member such as a sealed tubular member, for example a metal pipe, in which is established a partial vacuum. Reference numeral 312 generally refers to a heat pipe, however, in the following discussion, an alphanumeric character is added to reference numeral 312 when referring to a specific heat pipe comprising the heat dissipation device 300 as shown in FIG. 2. A pre-specified amount of a fluid, for example methanol, is disposed with the sealed member as the working fluid of the heat pipe.

A heat pipe 312 is generally considered as having three sections, an evaporator section 313a, an adiabatic section 313c and a condensate or condenser section 313b. In use, heat energy is absorbed at one end of the sealed member, the evaporator section, by the vaporization of the working fluid within the sealed member, the vaporized fluid or gaseous heated material is communicated to the other end of the sealed member, the condensate section via the adiabatic section. The absorbed heat energy is released at the condensate section of the heat pipe by the condensation of the vapor back to a fluid state. The condensate or condensed working fluid is then communicated back to the evaporator section via the adiabatic section, whereby heat energy can again be absorbed to again vaporize the returned condensate and thus repeat the above heat transfer process.

Heat pipes also are generally categorized as being a thermo-siphon type of heat pipe or a wick or capillary type of heat pipe, however, it is also common for localized portions of a thermo-siphon type of heat pipe to include a wick, for example to avoid the formation of puddles of the fluid in that localized portion. In the thermo-siphon type of heat pipe, gravity aids the return of the condensate from the evaporator section to the condensate section of the heat pipe. To facilitate such gravity return of the condensate to the condensate section, a thermo-siphon type of heat pipe is typically configured and arranged with a sloping to vertical arrangement.

With the capillary or wick type of heat pipes a material in the form of, for example, an inner lining is disposed within the sealed member. The material is of the type as is known to those skilled in the art that allows the condensate to be communicated (e.g., via capillary action) from the condensate section back to the evaporator section without having to rely upon the influence of gravity. In an exemplary illustrative embodiment the material comprises a sintered powder wick structure as is known to those skilled in the art. When such wicking material is used in combination with a thermo-siphon type of heat pipe, the wicking material typically is located in the evaporator section of the heat pipe.

In an exemplary embodiment, the heat pipe is any one of a number of heat pipes as manufactured by Thermacore, Inc. In an exemplary illustrative embodiment a heat pipe 312 for use in the present invention is of the thermo-siphon type and comprises a copper tubular member being sealed at both ends with methanol as the working fluid within the tubular member. In addition a sintered powder is disposed in the evaporator section thereof comprising the wick material.

Figure 5A:
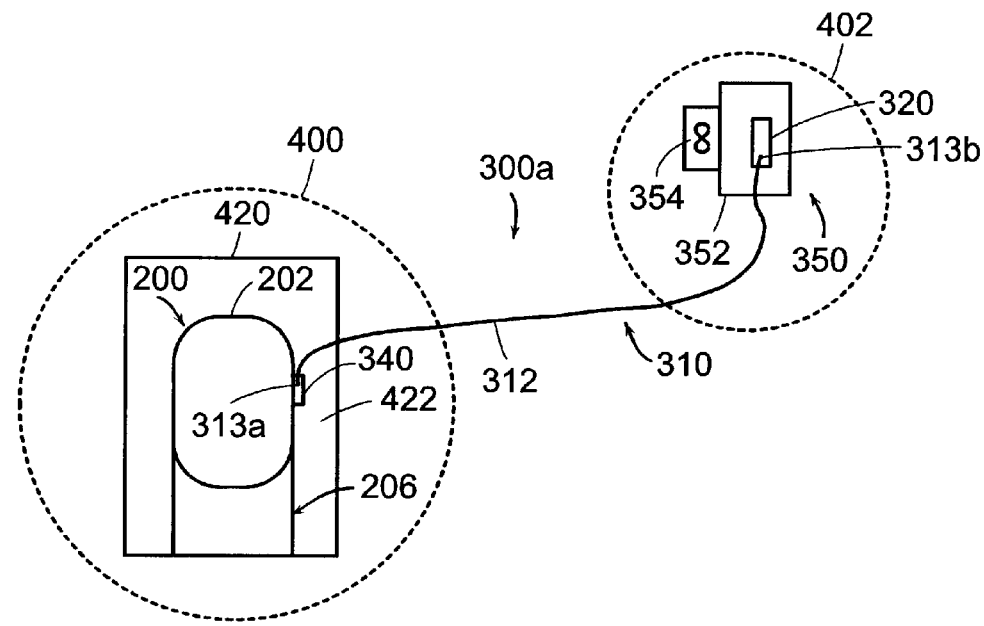
FIG. 5A is a schematic view of a flywheel energy storage system with a heat dissipation device according to a second embodiment of the present invention.
Figure 5B:
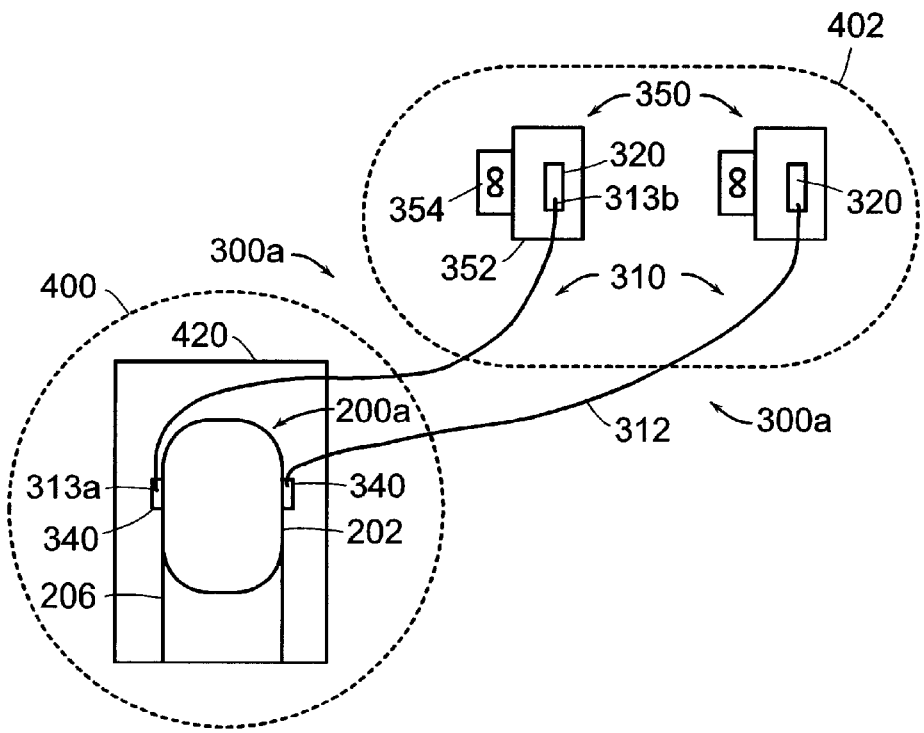
FIG. 5B is a schematic view of the flywheel energy storage system of FIG. 5A configured with a plurality of heat dissipation devices.
Figure 5C:
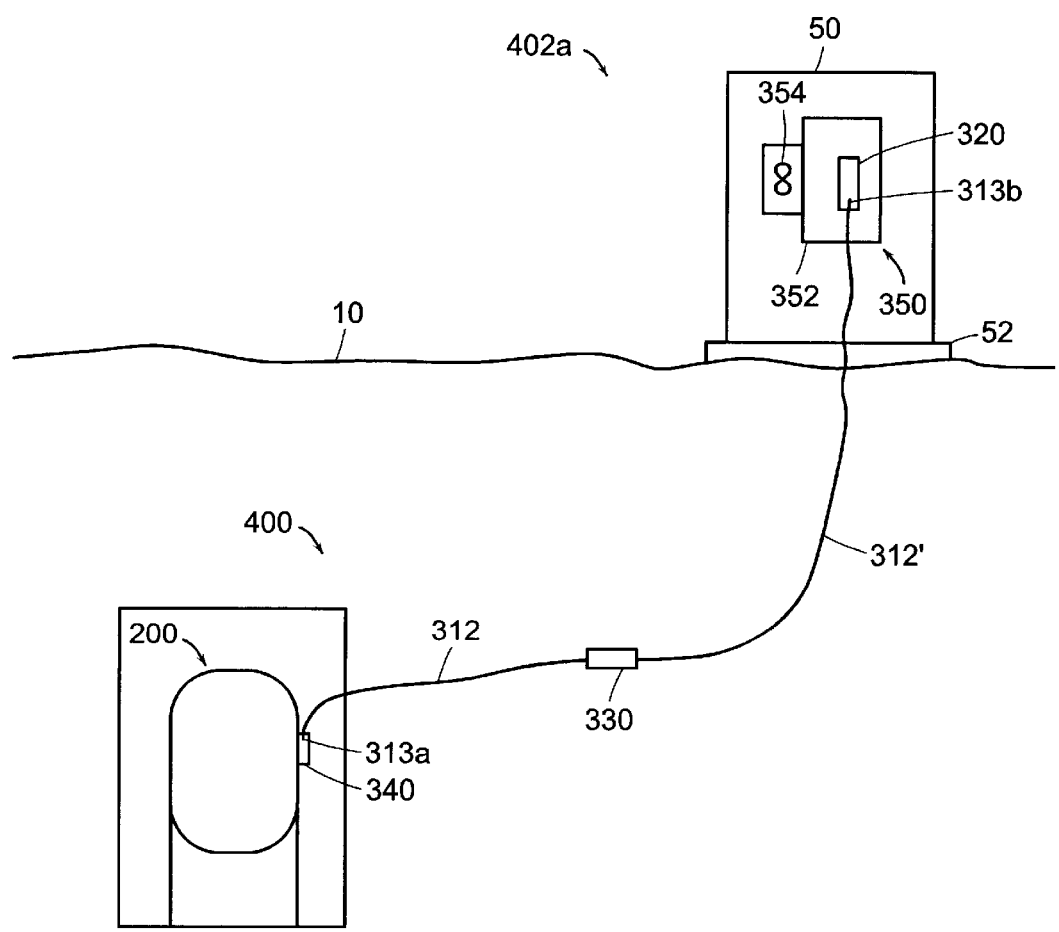
FIG. 5C is a schematic view of the flywheel energy storage system of FIG. 5A illustrating a below/above grade arrangement.

Reference is made herein to a proximal heat sink 400 that is proximal the flywheel energy storage system (FESS) 200 and a remote heat sink 402 (FIGS. 5A–C). The proximal heat sink 400 includes the material surrounding the FESS 200 or surrounding the structure 420 about the FESS. Thus, the proximal heat sink 400 is established based on the location of the end user cabinet or apparatus that the FESS can be providing energy to. As such, the proximal heat sink 400 is defined generally based on equipment location requirements and secondarily based on heat transfer characteristics.

The remote heat sink 402, however, is defined generally upon heat transfer characteristics so that at least a portion of the heat energy generated by the one or more FESS heat generating components is dissipated in the remote heat sink. Thus, the remote heat sink 402 is based on the location of the materials having the desired heat transfer characteristics, which location can be remote from the FESS as well as the location of the end user cabinet or apparatus that the FESS can be providing energy to.

As such, to accomplish such locating of the heat dissipating member 320 in the remote heat sink 402, the heat pipe member 310 includes a first heat pipe subassembly 314 and one or more transition heat pipe subassemblies 316 each including at least a heat pipe 312 as herein above described. The heat pipe subassemblies 314, 316 making up the heat pipe member 310 are interconnected to each other using any of a number of techniques and/or mechanisms known to those skilled in the art. In addition, the heat pipe member 310 can further include one or more heat pipes 312 for further interconnecting these heat pipe subassemblies 314, 316 to each, for example to interconnect two transition heat pipe subassemblies to each other.

In the illustrated embodiment, the transition heat pipe subassembly 316 is thermally and mechanically coupled to the first heat pipe subassembly 314 by a coupler 330. Additionally, in the illustrated embodiment, the transition heat pipe subassembly 316 is thermally and mechanically coupled to the evaporator section 313a of the heat pipe 312c of the heat dissipation member 320 by means of another coupler 330. It should be recognized that the embodiment being illustrated in FIG. 2 is exemplary of one arrangement of heat pipes 312 and couplers 330 to make up a heat pipe member 310, and that it is within the scope of the present invention for the heat pipe member to be composed of any arrangement of couplers and heat pipes that otherwise provides a member generally capable of transferring heat energy from the FESS 200 to the remote heat sink 402 as described herein.

There is shown in FIGS. 3A,B an exemplary coupler 330 configured and arranged to mechanically and thermally couple thereto the condensate section 313b of one heat pipe to the evaporator section 313a of another heat pipe so that heat energy released by the vapor condensing in the condensate section 313b is communicated to and absorbed by the liquid in the evaporator section 313a via the coupler 330. For purposes of further describing the coupler 330, specific reference is made hereinafter to the coupler interconnecting the condensate section 313b of the heat pipe 312a of the first heat pipe subassembly 314 and the evaporator section 313a of the transition heat pipe subassembly 316, however, it shall be recognized that the coupler is not so limited to this specific application.

The coupler 330 is more particular configured and arranged so as to include first and second members 332, 334. The coupler first member 332 includes a first through aperture 336 that extends lengthwise (i.e., along a long axis thereof, which through aperture is sized so as to receive therein the condensate section 313b of the transition subassembly heat pipe 312b. In the illustrated embodiment, the condensate section 313b is mechanically secured and thermally coupled within the first through aperture 336 to the coupler first member 332 using any of a number of techniques known to those skilled in the art. In a specific embodiment, such securing and coupling is accomplished by soldering.

The first and second members 332, 334 also are each configured so a dished or an arcuate region is provided in opposing surfaces thereof that extend lengthwise so as to form a second through aperture 338, extending lengthwise, when these opposing surfaces of the first and second members mate with each other. The so-formed second through aperture 338 is preferably sized so that the evaporator section 313a of the first subassembly heat pipe 312a is mechanically secured within the second through aperture 338 by clamping when the first and second members 332, 334 are mated or joined to each other.

When so secured within the second through aperture 338, the evaporator section 313a of the first subassembly heat pipe 312a also is thermally coupled to the first and second members 332,334 via the contact surfaces in the arcuate regions of the first and second members. The first and second members 332, 334 are mated to each other using any of a number of techniques known to those skilled in the art including mechanically (e.g., bolting), welding, soldering, brazing and adhesives. In a specific embodiment, the first and second members 332,334 are secured to each other mechanically so as to allow selective securing and de-securing of the coupler 330 to the first subassembly heat pipe 312a.

It should be recognized that it is within the scope of the present invention for the coupler 330 to be configured so that the first through aperture 336 is formed in a similar fashion as that for the above described second through aperture 338. Correspondingly, it is within the scope of the present invention for the coupler 330 to be configured so the second through aperture 338 is formed in a similar fashion as that for the first through aperture 336 and the heat pipe section secured therein in a similar fashion as described above for the first through aperture.

The coupler 330 is constructed from any of a number of materials known in the art that have the structural and thermal characteristics otherwise consistent with the teachings of the present invention. In particular embodiments, the materials also are compatible with the materials of the heat pipe being secured therein. In a specific illustrative embodiment, the coupler first and second members 332, 334 are made from copper and the heat pipe condensate section 313b is secured in the first through aperture 336 by soldering.

In further embodiments, the outer surfaces of the heat pipe 312 proximal the condenser and/or evaporator sections 313a,b are plated with a material such as tin, for example using MIL spec MIL-T-10727C, to a thickness of about 0.002–0.003 inches. The plating 311 of these sections of the heat pipe 312 with tin improves thermal coupling between the heat pipe and the structure it is coupled to or in contact with by reducing the thermal contact resistance between the heat pipe and this contacting structure. For example, the plating reduces the thermal contact resistance between the heat pipe 312 and the contact surfaces of the arcuate regions of the coupler second through aperture 338.

The heat dissipating member 320 is any of a number of heat transfer devices or mechanisms known to those skilled in the art by which heat energy can be transferred therefrom to the particular form of the remote heat sink 402. In the embodiment illustrated in FIG. 2 and more clearly shown in FIGS. 4A–B, the heat dissipating member 320 includes a heat pipe 312c and a plurality, more particularly a multiplicity of fins 322 (i.e., three or more fins) that are thermally and mechanically coupled to the exterior surface of the heat pipe. These fins 322 also are spaced from each other along the long axis of the heat pipe 312c so as to form an otherwise conventional natural convection fin stack or a forced flow fin stack (i.e., the case where the medium making up the remote heat sink is forceably flowed across the fin stack, for example by a fan or pump).

As shown more clearly in FIG. 4A, the heat pipe 312c of the heat dissipating member 320 is configured so as to form two condensate sections 313b to which the fins 322 are mechanically and thermally coupled. Alternatively and as shown in FIGS. 4C–D, a heat dissipating member 320a is configurable so as to include a heat pipe 312c' having a single condensate section 313b. It also should be recognized that it is within the scope of the present invention for such a finned heat dissipating member to be configured and arranged so as to include a plurality or more of plate fin stacks, for example a heat pipe having two condensate sections where a separate stack of fins are mechanically and thermally coupled to each condensate section.

In more specific exemplary embodiments, the heat pipes 312c, 312c' are a thermo-siphon type of heat pipe composed of a copper tubular member in which is disposed methanol as the working fluid. Further a sintered powder is disposed within the tubular member in the evaporator section 313a to form a wick or capillary structure. In an exemplary embodiment, the condensate section 313b is arranged so as to be at least 5 degrees above the horizontal.

The fins 322 are made of a heat conductive material appropriate for the service conditions or environment the material is expect to be exposed to in the remote heat sink 402 for example the conditions one would expect when the remote heat sink is the atmosphere. The number, spacing, thickness and size of the fins 322 is set so that the heat dissipating member 320 is capable of transferring a given amount of heat energy to the remote heat sink, for example 60W. In illustrative, exemplary embodiments, each fin is 6"×6" or 6"×12", has a thickness of about 0.040 inches and is made of aluminum. The fin stacks have exemplary lengths of 16 and 28 inches where there are about 2 to 2.2 fins per inch.

Some other exemplary heat dissipating members 320b–d that transfer heat energy therefrom to a fluid or a heat sink are shown in FIGS. 4E–H. There is shown in FIG. 4E a heat dissipating member 320b formed in the shape of a plate and having a port 324 in which is thermally received the condensate section 313b of the heat pipe 312c'. Additionally, the plate shaped member can include surface artifacts that increase the surface area available for transferring heat energy. In one exemplary embodiment as shown in FIG. 4F, the heat dissipating member 320c includes surface artifacts comprising a plurality of fins 326 that extend outwardly from the plate surface. In another exemplary embodiment as shown in FIGS. 4G–H, the heat dissipating member 320d includes surface artifacts comprising a pin-fin structure made up of a plurality or more of pins 328 that extend outwardly from the plate surface.

These heat dissipating members 320b–d are made up of any of a number of materials or combination of materials known to those skilled in the art which are effective for transferring heat energy to the particular form of the heat sink making up the remote heat sink 402, as well as for the intended service. Such materials include for example aluminum. In an illustrative embodiment, the heat dissipating member 320c and outwardly extending fins 326 of FIG. 4F is an aluminum extrusion.

Figure 6A:
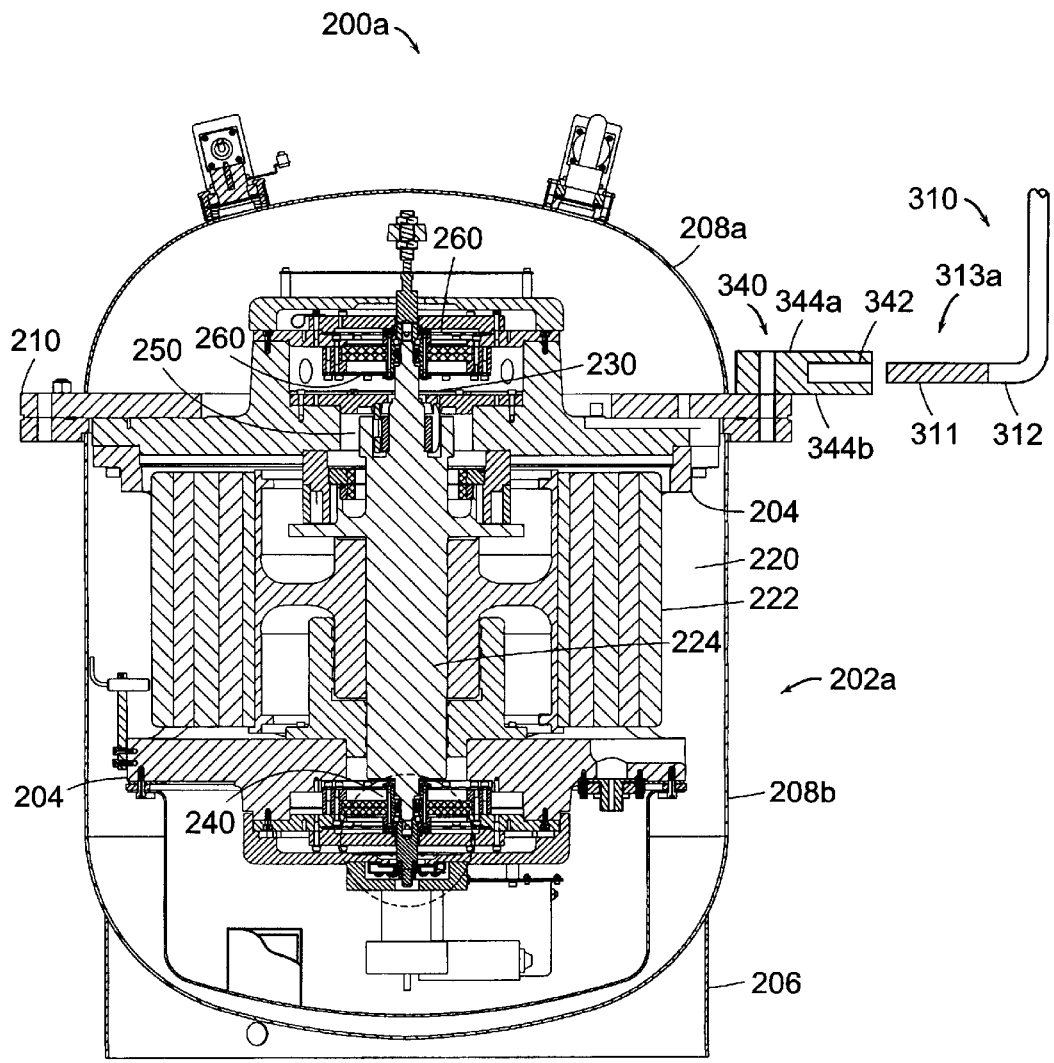
FIG. 6A is a cross sectional view of an exemplary flywheel energy storage system having a heat dissipation device as in FIG. 5A, with portions of the heat dissipation device removed for clarity.

Referring now to FIGS. 5A–B, there is shown various schematic views of a flywheel energy storage systems (FESS) 200 having one or more heat generating components therein, to which is thermally coupled one or more heat dissipation devices 300a according to one embodiment of the present invention. There also is shown in FIG. 5C a schematic view of the flywheel energy storage system 200 and the heat dissipation device 300a illustrating a below/above grade application. Reference also should be made to FIG. 6A, which is a cross sectional view of an exemplary flywheel energy storage system 200a that is configured with a heat dissipation device 300a in the fashion illustrated schematically in FIG. 2A for structure not illustrated in FIGS. 5A–C. It should be noted that some components comprising the heat dissipation device 300a, however, have not been shown in FIG. 6A for clarity.

Referring now to FIG. 5A, there is shown a heat dissipation device 300a that is thermally coupled to a portion of the housing 202 of the flywheel energy storage system (FESS) 200a and to a remote heat sink 402. The FESS 200 also includes one or more heat generating components, for example, the magnetic bearing assemblies 230, 240 that rotatably support the rotor(s) 222 and shaft 224 or the motor 250 that spins the rotor (FIG. 6A). The one or more heat generating components of the FESS 200 are thermally coupled to the FESS housing 202 using any of a number techniques known to those skilled in the art so that the heat energy being produced by these components is communicated to the FESS housing. For example, and as illustrated in FIG. 6A, the support members or structure 204 for the rotor(s) 222 is thermally coupled to the FESS housing 202.

The FESS 200 is located within a chamber 422 formed by a structure 420 that is disposed in a first heat sink proximal the FESS, a proximal heat sink 400. A FESS base 206 on a bottom surface of the structure 420 typically supports the FESS housing 202. It should be recognized, however, that the structure 420 and the FESS base 206 are illustrative of a particular configuration and that it is within the scope of the present invention to adapt the heat dissipation device and related methodology of the present invention for use with any other arrangements or configurations for positioning and providing external support for an FESS. For example, the FESS can be buried so as to be in direct contact with the earth as illustrated in FIG. 7C or the FESS can be supported by hanger members from the chamber ceiling. In an illustrative exemplary embodiment, the FESS housing 202 is comprised at least in part of any of a number of thermally conductive materials as is known to those skilled in the art, and which materials also are suitable for the intended use, such materials include for example, steel, aluminum or a combination of the two.

The heat dissipating device 300a includes a heat pipe member 310, a heat dissipating member 320 that is thermally coupled to the heat pipe member and the remote heat sink 402, and a heat transfer member 340. Further, the heat transfer member 340 is thermally coupled and secured to the FESS housing 202 and to the heat pipe member 310, more particular the evaporator section 313a of a heat pipe comprising the heat pipe member. The heat transfer member 340 is configured and arranged (e.g., sized and shaped) so that a desired amount of heat energy flowing from the one or more FESS heat generating components to the housing 202, flows from the housing into the heat transfer member and thence to the heat pipe member 310.

The heat transfer member 340 is made of a thermally conductive material that also is suitable for the intended use, such as steel, aluminum or coated copper (e.g., epoxy coated copper). The heat transfer member 340 also is secured and thermally coupled to the housing 202 using any of a number of techniques or methods known to those skilled in the art. For example, the heat transfer member is mechanically secured by means of a bolted connection, welding, brazing, soldering and adhesives to a pad provided on a surface of the housing. The contact surface of the heat transfer member 340 that is in contact with the FESS housing 202 is sized and shaped so as to provide a surface area that is sufficient for transferring a desired amount of heat energy from the FESS housing to the heat transfer member 340 and thence to the heat pipe member 310.

The heat transfer member 340 is further configured so it is thermally engaged with or thermally coupled to the evaporator section 313a of the heat pipe 312 comprising the heat pipe member 310 and so that this end or section of this heat pipe is secured to the heat transfer member. For example, the heat transfer member 340 is configured so as to include an aperture or pocket 342 therein in which pocket or aperture is received the end of the heat pipe 312 containing the evaporator section 313a. Using any of a number of techniques known to those skilled in the art, the outer surfaces of the heat pipe evaporator section 313a are thermally coupled to the inner surfaces comprising the aperture or pocket 342 and this heat pipe end is secured within the pocket/aperture. The pocket or surfaces of the heat transfer member pocket 342 opposing the heat pipe evaporator section 313a also are set so as to provide a surface area sufficient for purposes of the transfer of heat energy from the heat transfer member 340 to the heat pipe evaporator section 313a.

In an illustrative exemplary embodiment (see FIG. 6A), the heat transfer member 340 is an assembly having two sections 344a,b with a depression or arcuate region formed in a surface of each section that extends lengthwise. When the two sections are joined together the aperture or pocket 342 is formed by the opposing depressions. The depressions also are sized such that the end of the heat pipe 312 is clamped between the two sections when joined together, thereby securing and thermal engaging the heat pipe 312 with the heat transfer member 340. In another exemplary embodiment, a material is inserted into the pocket or the depressions along with the end of the heat pipe 312 including the evaporator section 313a so as to secure (e.g., pot) it within the pocket and to thermally couple the heat pipe evaporator section to the heat transfer member 340. As also indicated above, a plating 311 is applied to the outer surfaces of the portion of the heat pipe 312 including the evaporator section 313a so as to reduce thermal contact resistance between the heat pipe and the heat transfer member 340.

In yet another exemplary embodiment, and with reference to FIG. 6A, the housing 202a includes an upper section 208a and a lower section 208b each section having a flanged end type of end detail. With this arrangement, the upper and lower sections 208a,b are secured to each other at the flanged ends 210 for example, by bolting the flanged ends together. In this embodiment, the heat transfer member 340 is secured to the flanged ends 210, for example, using the through bolts, nuts and washers (not shown) that mechanically secure the flanged ends together. As also described above, the heat transfer member 340 comprises two opposing sections that are formed so as to define a pocket 342 therein to receive the evaporator section 313a of the heat pipe member 310 more particularly, the evaporator section 313a of the heat pipe 312 of the heat pipe member 310. Thus, when the heat transfer member 340 is secured to the flanged ends 210 an end of the of the heat pipe is clamped within the heat transfer member, thereby also thermally coupling the heat pipe evaporator section to the heat transfer member.

The heat dissipating member 320 is thermally coupled or engaged with the condensate section 313b of the heat pipe member, more particularly the condensate section 313b of the heat pipe 312 comprising the heat pipe member so the heat energy being released at the condensate section by the condensing vapor is dissipated to the remote heat sink 402 via the heat dissipating member. As hereinabove described, this heat pipe condensate section 313b is secured and thermally coupled to the heat dissipating member 320 using any of a number of techniques known to those skilled in the art, including for example clamp type of connections. Reference shall be made to the foregoing discussion regarding FIGS. 4A–G for further details of heat dissipating members and the coupling of the condensate section 313b to such heat dissipating members.

In a further embodiment, when the remote heat sink 402 is a fluid, the heat dissipating device 300 further includes a fluid flowing apparatus 350 configured and arranged so as to flow or force the fluid comprising the remote heat sink 402 past the heat dissipating member 320. In the illustrated embodiment, the fluid flowing apparatus 350 includes a housing 352 in which is disposed the heat dissipating member 320 and a flow device 354 particularly configured and arranged to cause the fluid to flow. For example, when the fluid is a gas such as atmosphere, the flow device 354 can be a fan 354 and when the fluid is a liquid, the flow device can be a pump (e.g., see FIG. 11).

It should be recognized that the housing and fan that are provided to house and cool the heat generating components within the end user's cabinet 50 (FIG. 5C) can be utilized as the fluid flowing apparatus 350. As is known to those skilled in the art, flowing a fluid past a heat transfer surface can be an effective mechanism for increasing the transfer of heat energy from that surface to the fluid without increasing the relative size of the heat transferring member. Thus, heat energy dissipation to the remote heat sink 402 can be increased without increasing the size of the heat dissipating member 320. As described hereinafter, this also can provide a mechanism by which the heat energy being dissipated can be made useful heat energy.

As indicated above, the remote heat sink 402 is defined generally upon heat transfer characteristics so that at least a portion of the heat energy generated by the one or more FESS heat generating components can be dissipated into the remote heat sink. The remote heat sink 402 is selected from heat sinks made up of solids, fluids (e.g., gases or liquids) or materials made up of a mixture of solids and liquids (e.g., damp soil). In one exemplary embodiment, the material comprising the proximal and remote heat sinks 400, 402 have similar heat transfer characteristics. In another exemplary embodiment, the heat transfer characteristics of the remote heat sink 402 are different from those for the material making up the proximal heat sink 400. Such different heat transfer characteristics of the remote heat sink 402 being generally better for purposes of continuously receiving hat energy from and conducting heat energy away from the heat dissipating member 320 as compared to the proximal heat sink 400. The remote heat sink 402 also can be in a different form than that of the proximal heat sink 400, for example, the proximal heat sink can be generally in the form of a solid and the remote heat sink can be a fluid such as a gas or liquid. Also, the gas or liquid comprising the remote heat sink 402 can flow past the heat dissipating member 320 or a gas or liquid that does not generally move in bulk with respect to the heat dissipating member (e.g., atmosphere, a pond or lake).

To accomplish such locating of the heat dissipating member 320, the length of the heat pipe member 310 is set so that the heat dissipating member is located in a remote heat sink 402 having the desired heat transfer properties or characteristics. As such the heat pipe member 310 can comprise a heat pipe 312 thermally and coupled to the FESS and the heat dissipating member 320. In the case where the remote heat sink 402 is at such a distance from the FESS sealed member that it is not practical for a single heat pipe 312 to be utilized, then the heat pipe member 310, as described hereinabove and as shown in FIG. 5C, can comprise a plurality or more of heat pipes that are thermally coupled to each other by a coupler 330 and to the FESS 200 and to the heat dissipating member 320.

Now referring to FIG. 5B there is shown a schematic view of a flywheel energy storage system (FESS) 200 in which a plurality of heat dissipating devices 300a are provided to dissipate at least some of the heat energy being generated by the one or more FESS heat generating components to the second heat sink 402. Reference shall be made to the foregoing discussion for FIG. 5A for further details regarding the FESS 200, the proximal and remote heat sinks 400, 402 and the elements of the heat dissipation device 300a not otherwise described below.

In the illustrated embodiment, the heat transfer member 340 of each heat dissipating device 300a is thermally coupled to different portions of the FESS housing 202 so as to allow heat energy from these different portions to be communicated away by the plurality of heat dissipating devices 300a. Also, each of the heat dissipating members 320 are located in the remote sink 402, however, it is within the scope of the present invention for each heat dissipating member to be located in remote heat sinks having different locations and/or forms. For example, the heat dissipating members 320 could be located in the same form of a heat sink, such as the atmosphere, but spaced from each other or each heat dissipating member 320 could be located in a different form of heat sink, for example one gaseous and one solid or one gaseous and one liquid. This thereby increases the flexibility of the heat dissipation device 300a to be adapted to deal with a wide range of physical arrangements as well as providing the capability to increase and optimize heat transfer from the FESS.

Now referring to FIG. 5C there is shown a schematic view of a flywheel energy storage system (FESS) 200 with a heat dissipation device 300a that is thermally coupled to the FESS and to a specific form of a remote heat sink 402a, which is atmosphere. More particularly, there is shown a specific application where the FESS 200 is disposed below grade 10 (i.e., underground) and where the heat dissipating member 320 of the heat dissipation device 300a is located above grade (i.e., above-ground) more specifically in an end user's cabinet 50 that is mounted on a pad 52. Reference shall be made to the foregoing discussion for FIGS. 5A–B for details, features and embodiments not specifically described below.

In the illustrative embodiment, and as described above, the heat pipe member 310 comprises two heat pipes 312, 312' thermally coupled together via a coupler 330. The coupler 330 as herein describe also mechanically secures these heat pipes 312, 312' therein. A fan 354 also is provided so as to flow the gas comprising atmosphere across the heat dissipating member 320 and through the end user cabinet 50 to atmosphere. With such an arrangement, the heat energy is being dissipated from the FESS 200 to a different type or form of heat sink 402a than that which the FESS is located in. Further such an arrangement also integrates the heat dissipation function into the end user cabinet 50 such that additional space above grade 10 is not required for a heat dissipating member 320.

Now referring to FIG. 6A, there is shown a cross-sectional view of an exemplary flywheel energy storage system 200a with a heat dissipation device 300a according to the present invention with portions thereof not shown for clarity. Reference shall be made to the above discussion concerning FIGS. 2–5 for further details and information regarding the heat dissipation device 300a. The flywheel energy storage system 200a also embodies one or more heat transferring assemblies 260 to further the dissipation of heat energy from a heat producing source of the FESS or for heat producing components of any apparatus or system to the remote heat sink 402.

The illustrative flywheel energy storage system 200a includes a housing 202, which is suitably sealed to maintain gas pressure therein at or below a predetermined level for optimal performance of the flywheel energy storage system. Operatively disposed in the housing 202 is a flywheel assembly 220, which includes a shaft 224 coupled between upper and lower bearings 230,240. The flywheel assembly 220 also includes one or more flywheel rotors 222, each typically about 12 inches in diameter, which are coupled to the shaft 224. Also, the predetermined gas pressure level maintained in a space bounded by the housing 202 typically is at a near-vacuum, thereby minimizing drag on the flywheel rotors 222 and reducing windage losses during operation of the flywheel system 200a. Reference also should be made to U.S. Ser. No. 09/606,724 (entitled "FLYWHEEL SYSTEM WITH PARALLEL PUMPING ARRANGEMENT") and PCT Application Number PCT/US01/20627 for other details and features of the illustrated flywheel energy storage system 200a not otherwise provided herein.

The flywheel assembly 220 further includes at least one heat transferring assembly 260 for each of the upper and lower bearings 230, 240. In the illustrated embodiment, two heat transferring assemblies 260 are provided for each bearing, an upper heat transferring assembly and a lower heat transferring assembly that are axially displaced from each other so as to be proximal the axial ends of each nearing assembly. In this way, heat energy from each end of the bearing is dissipated to the remote heat sink. Reference shall be made to U.S. Ser. No. 09/924,153 (entitled "DEVICE FOR COOLING A BEARING, FLYWHEEEL ENERGY STORAGE SYSTEM USING SUCH A BEARING COOLING DEVICE AND METHODS RELATED THERETO") the teachings of which are incorporated herein by reference for further details regarding the heat transferring assemblies 260.

Figure 6B:
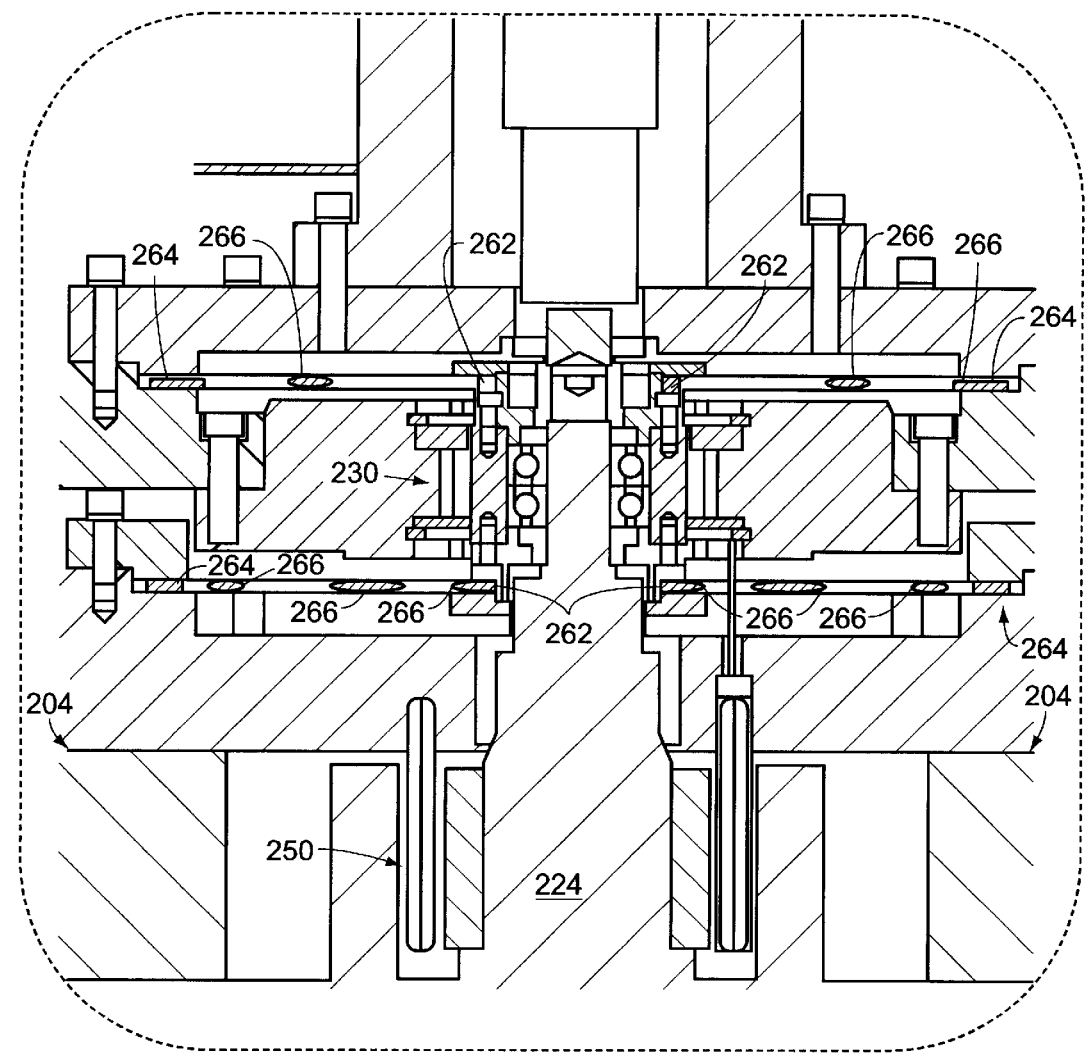
FIG. 6B is an expanded cross-sectional view of a flywheel energy storage system (FESS) to further illustrate the FESS heat transferring assembly.
Figure 6C:
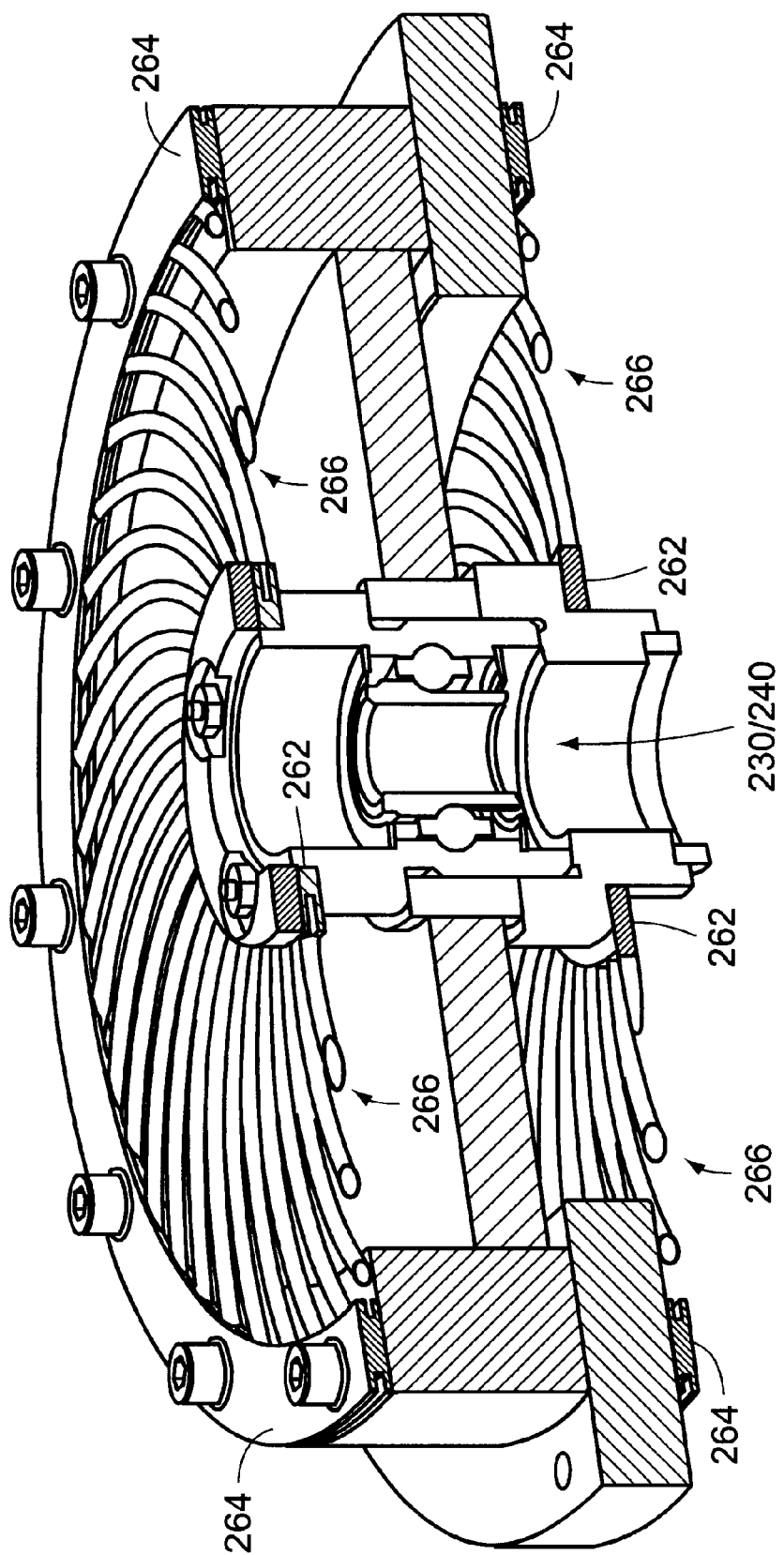
FIG. 6C is an isometric cross-sectional view of a flywheel energy storage system as shown in FIG. 6B to further illustrate the details of the FESS heat transferring assembly.

As more clearly shown in FIGS. 6B–C, each heat transferring assembly 260 includes an inner member 262, and outer member 264 and a plurality or more of intermediate members 266. The inner, outer and intermediate members 262–266 are thermally coupled to each other such that energy received by the inner member is communicated to each of the intermediate members and thence to the outer member. Further, the inner and outer members 262, 264 are at least in part composed of a thermal conductive material and the intermediate members 266 are composed of a thermal conductive material. In the illustrated embodiment, the intermediate members 266 are arcuate. It should be noted that in the embodiment illustrated in FIG. 6B, the cross-sectional view proximal the inner and outer members 262, 264 in some cases includes a portion of the intermediate member 266.

Figure 8A:
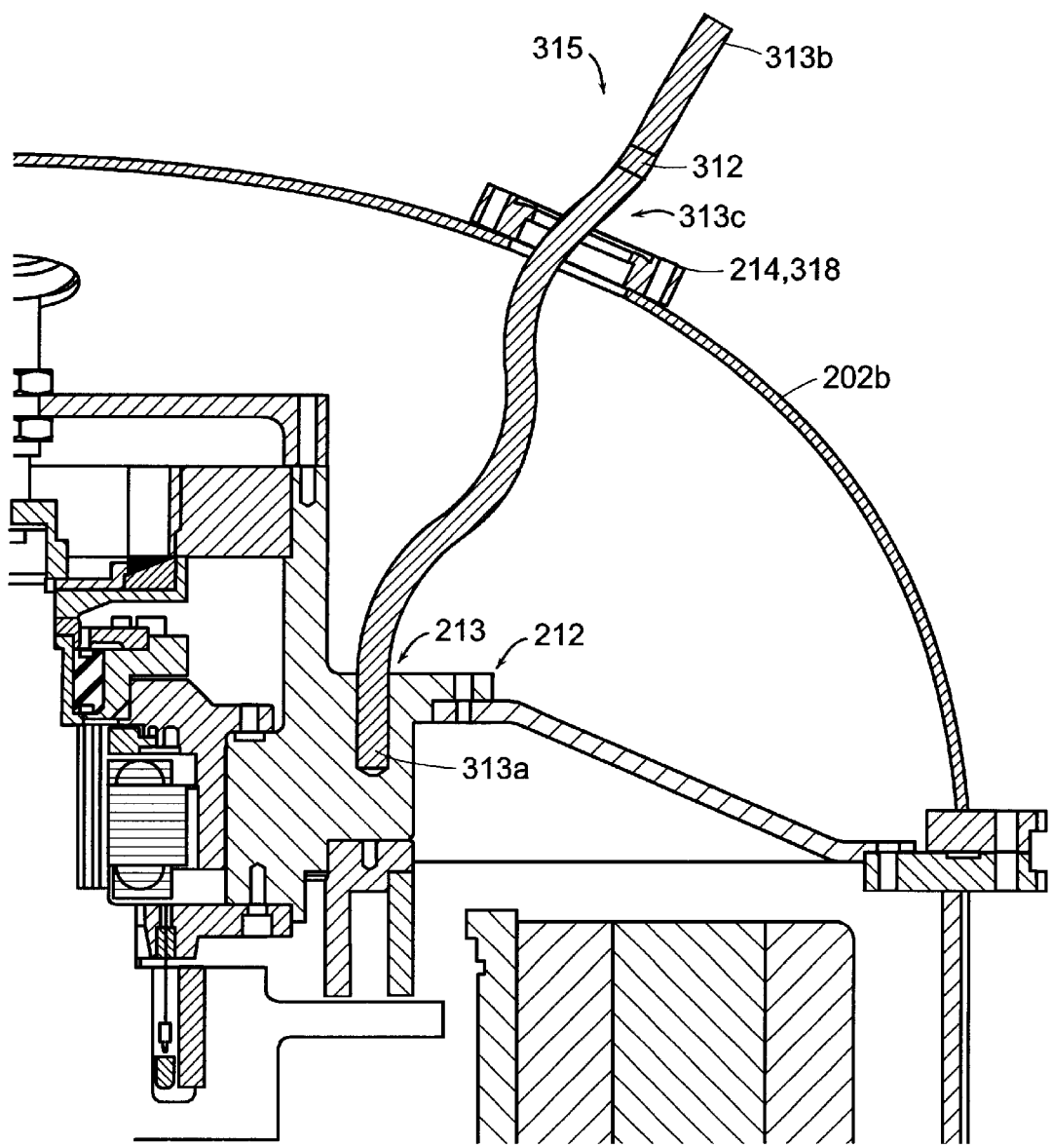
FIG. 8A is a cross sectional view of a part of an exemplary flywheel energy storage system (FESS) illustrating one technique for securing and coupling a heat pipe member to internal structure of the FESS.

The inner member 262 of the upper and lower heat transferring assemblies is disposed in the flywheel assembly 220 such that the inner member is proximal to either of the upper or lower bearing 230, 240. Each inner member 262 also is arranged in the flywheel assembly 220 so it is in thermal engagement or thermally coupled or connected to the proximal bearing 230 such that at least a portion of the heat energy being generated by the bearing 230 is communicated to the inner member. Correspondingly, the outer member 264 of the upper and lower heat transferring assemblies is disposed in the flywheel assembly 220 such that the outer member is in thermal engagement or thermally coupled or connected to the support members 204. Thus, heat energy from the inner member 262 being communicated to the outer member 264 via the intermediate members 266 is communicated to the support members 204. This heat energy in turn is communicated to the housing 202 and thence at least a portion thereof is communicated to the remote heat sink 402 via the heat dissipation device 300a. Alternatively, and as shown in FIG. 8A the evaporator section 313a of the heat pipe is thermally engaged to the support members 204 so that at least portion of the heat energy being communicated to the outer member 264 is communicated to the heat pipe 312.

With the foregoing structure, each heat transferring assembly 260 is arranged so that one end of it is proximal the source of the heat energy and so the other end is proximal a structure of the flywheel energy storage system 200a that is remote from the source of heat energy (e.g., heat generating FESS component). Consequently each heat transferring assembly 260 thus bypasses a portion of the interior structure of the FESS 200a. As such, the heat transferring assembly 260 provides a thermal path that easily conducts or communicates at least a portion of the heat energy being produced by the heat source to the structure of the flywheel energy storage system. As a consequence, heat energy of a bearing for example is more readily communicated to the remote heat sink 402, thereby making more optimal the operational conditions (e.g., temperature) of the bearing.

In addition, the heat transferring assembly 260 also is constructed so as to allow axial and radial movement between and with respect to the inner and outer members 262, 264. Consequently, this prevents an interaction of the heat transferring assembly 260 with at least the active lift bearing of the flywheel energy storage system. In other words, when one or more heat transferring assemblies 260 are used to cool the bearing(s) or bearing assembly of a flywheel energy storage system 400, the heat transferring assembly provides a mechanism or heat transfer path by which the flywheel bearing or bearing assembly is directly, thermally coupled to the grounded heat transfer part of the system yet allowing the shaft or rotor to be magnetically levitated without imposing excessive axial or radial forces. As also noted above, the heat transferring assembly 260 provides a direct heat transfer path for removing at least a portion of the heat energy from mechanical bearings, magnets or electromagnets of magnetic bearings or any other non-rotating parts, which require a predetermined amount of radial and axial stiffness, especially in a system being in a vacuum environment.

Figure 7A:
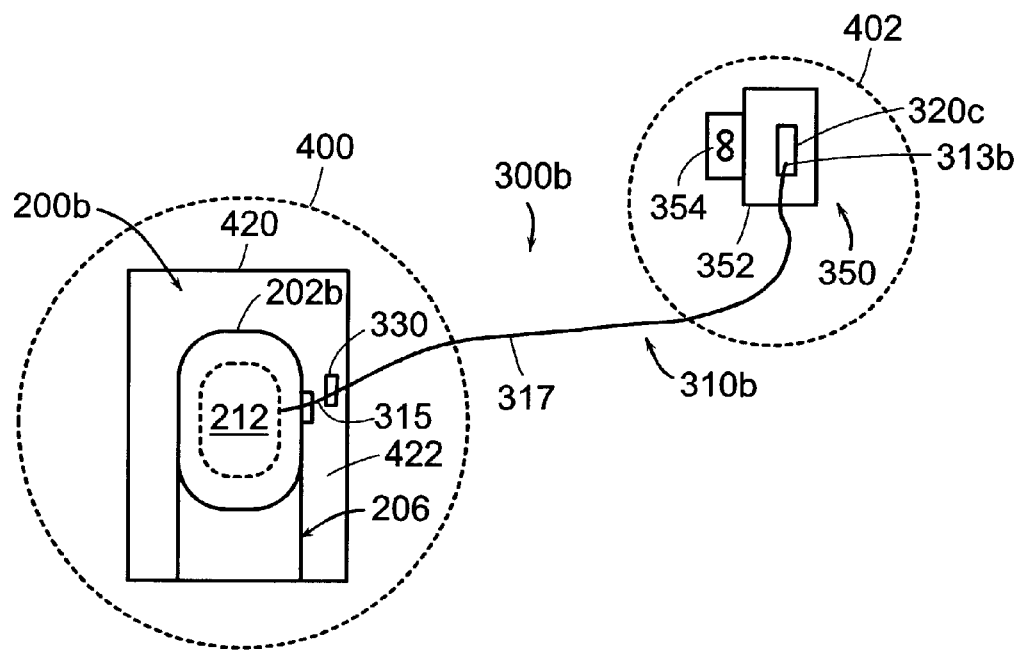
FIG. 7A is a schematic view of a flywheel energy storage system with a heat dissipation device according to another embodiment of the present invention.
Figure 7B:
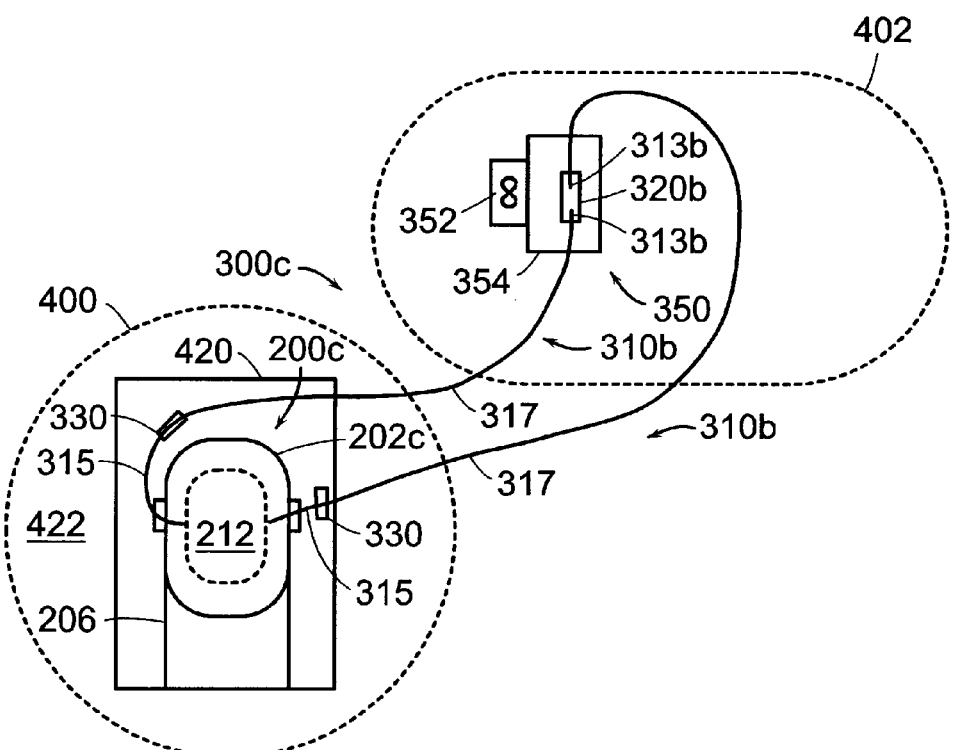
FIG. 7B is a schematic view of the flywheel energy storage system of FIG. 7A with a heat dissipation device including a plurality of heat pipes.
Figure 7C:
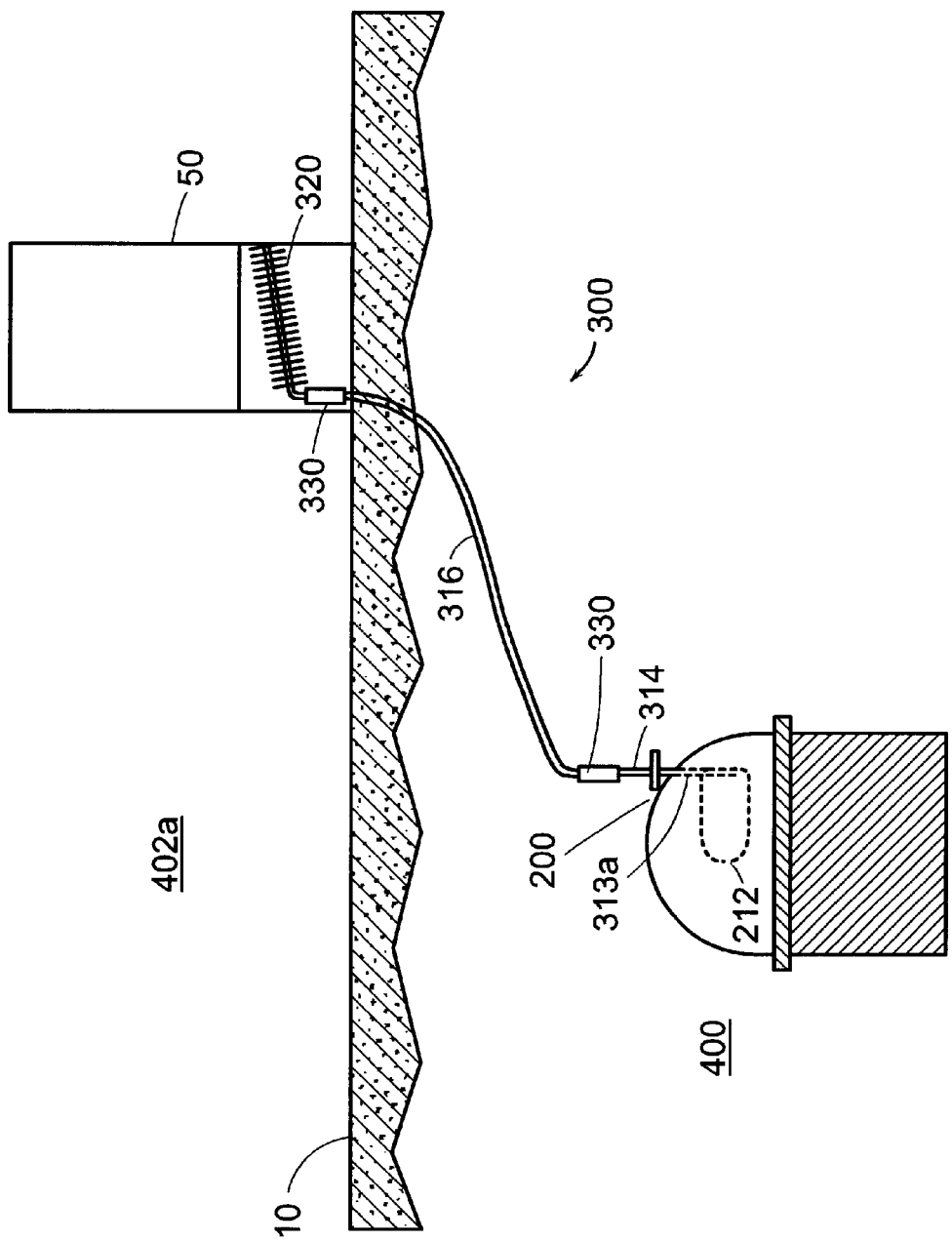
FIG. 7C is a cross sectional view of an exemplary flywheel energy storage system having a heat dissipation device according to the another embodiment.

Referring now to FIGS. 7A–B, there is shown various schematic views of a flywheel energy storage systems (FESS) 200b,c having one or more heat generating components therein, to which is thermally coupled one or more heat dissipation devices 300b,c according to another embodiment of the present invention. There also is shown in FIG. 7C a schematic view of the flywheel energy storage system 200d and a heat dissipation device 300d illustrating a below/above grade application. Reference also should be made to FIG. 8A, which is a cross sectional view of part of an exemplary flywheel energy storage system that illustrates one technique and mechanism for securing and thermally coupling an evaporator section 313a of the heat pipe member 310 to internal structure of the FESS. Reference shall be made to the foregoing discussion regarding FIGS. 2–7 for further details regarding common features as well as details, information and embodiments, of related elements.

Referring now to FIG. 7A, there is shown a heat dissipation device 300b that is thermally coupled and secured to a flywheel support structure 212 of the FESS 200b and to a remote heat sink 402. The FESS 200b includes one or more heat generating components, for example, the magnetic bearing assemblies 230,240 that rotatably support the rotor(s) 222 and shaft 224 or the motor 250 that spins the rotor (FIG. 6A). The one or more heat generating components of the FESS 200b are thermally coupled to the FESS flywheel support structure 212 using any of a number techniques known to those skilled in the art so that the heat energy being produced by these components is communicated to the flywheel support structure.

The heating dissipation device 300b of this embodiment includes a heat pipe member 310b and a heat dissipating member 320e that is thermally coupled to the heat pipe member. In the illustrated embodiment, the heat pipe member 310b includes first and second heat pipe subassemblies 315, 317, each including a heat pipe 312, that are mechanically and thermally coupled to each other by a coupler 330 as herein described. More particularly, the coupler 330 couples the condensate section 313b of the heat pipe for the first heat pipe subassembly 315 to the evaporator section 313a of the heat pipe of the second heat pipe subassembly 317. In this way, the heat energy being released from the first subassembly condensate section 313b is absorbed by the working fluid in the second subassembly evaporator section 313a.

The condensate section 313b of the heat pipe of the second heat pipe subassembly 317 is thermally coupled with the heat dissipating member 320e, as hereinabove described, so the heat energy released there from is communicated to the heat dissipating member and thence to the remote heat sink 402. Although the illustrated embodiment shows the heat pipe member 310b being comprised of two subassemblies, this shall not constitute a limitation as it is within the scope of the present invention for the heat pipe member to comprise one or more subassemblies members extending between the flywheel support structure 212 and the heat dissipating member 320e.

The evaporator section 313a of the heat pipe 312 for the first heat pipe subassembly 315 is mechanically and thermally coupled to the flywheel support structure 212 as hereinafter described so that the heat energy being produced by the FESS components and communicated to the flywheel support structure is communicated to the first heat pipe subassembly. Now referring also to FIG. 8A, there is shown one technique or embodiment for mechanically and thermally coupling the evaporator section 313a of the first subassembly heat pipe 312 to the flywheel support structure 212.

In this embodiment, the evaporator section 313a of the heat pipe 312 for the first heat pipe subassembly 315 is received in a pocket 213 provided in the flywheel support structure 212. This end of the heat pipe 312 is mechanically and thermally secured therein using any of a number of techniques known to those skilled in the art. In an illustrative embodiment, this end of the heat pipe is secured in the pocket by an epoxy or other adhesive material.

A conflat flange 318 is secured to the outside surface of the adiabatic section 313c of the heat pipe comprising the first subassembly 315 using any of a number of techniques known to those skilled in the art. In an exemplary embodiment, the conflat flange is secured by soldering. A mating conflat flange 214 is secured to the housing 202b at a position such that when the conflat flanges 214, 318 are secured to each other, for example by bolting, the evaporator section 313a can be easily located in the support structure pocket 213. In an exemplary embodiment, the mating conflat flange 214 is welded to the housing 202b. When secured to each other, the conflat flanges 214, 318 also form a pressure seal. It is within the scope of the present invention for other techniques known to those skilled in the art to be used to form a pressure boundary about the heat pipe 312 of the first subassembly 315.

Now referring to FIGS. 9A–F there is shown various views that illustrate other techniques for securing the evaporator section to the flywheel support structure 212 of an FESS as well as the configurations of the first heat pipe subassemblies embodying these techniques. Referring now to FIGS. 9A–D, there is shown the use of a radial clamping technique to secure and couple the first subassembly heat pipe 312a to the support structure. In the illustrated embodiments a portion 213a of the support structure 212 is configured so as to form one side of a clamp and another portion 213b of the support structure is configured so as to form the other or mating side of the clamp. The opposing surfaces of these two clamp portions 312a,b also are configured and arranged so as to receive and secure the heat pipe therein when the clamp portions are mated to each other.

In addition to illustrating the clamping technique FIGS. 9B,C also illustrates configuring the heat pipe 312a so a portion thereof within the housing 202 includes a flexible portion. In FIG. 9B, the heat pipe 312a' includes a bellows that provides flexibility in one or more directions, particularly axially. In FIG. 9C, the heat pipe 312a" is configured so as to include a helical section, which also provides flexibility in one or more directions.

Now referring to FIGS. 9E–F, there is shown a technique for threadably securing the heat pipe to the support structure. In the illustrated embodiment, the heat pipe 312aa includes threads and the support structure pocket 213a is a threaded pocket that is configured with complementary threads so the heat pipe can be threaded into the threaded pocket 213a. As shown in FIG. 9F, the threaded pocket can be further configured so as to include a thermal interface pad 215 as is known to those skilled in the art. When the heat pipe 312aa is threaded into the threaded pocket 213a the end of the heat pipe contacts and seats against the thermal interface pad 215.

Now referring to FIG. 7B there is shown another embodiment of a heat dissipation device 300b according to the present invention that is thermally coupled to the flywheel support structure 212 of the FESS 200c and to a remote heat sink 402. Reference shall be made to the foregoing discussion regarding FIG. 7A for common features and elements not otherwise described below. More particularly, the heat dissipation device 300c includes a plurality of heat pipe members 310b such as that shown in FIG. 7A and a heat dissipating member 320f. The heat dissipating member 320f is thermally coupled to each of the plurality of heat pipe members 310b.

In the illustrated embodiment, the first heat pipe subassemblies 315 of each heat pipe member 310b are thermally coupled or connected to the flywheel support structure 212 using for example any of the above described techniques. More specifically, the first heat pipe subassemblies are thermally coupled at different locations or to different portions of the flywheel support structure 212. In this way, all of the heat energy passing through the plurality of heat pipe members 310b is passed through the one heat dissipating device 320f to the remote heat sink 402.

Now referring to FIG. 7C there is shown a schematic view of a flywheel energy storage system (FESS) 200 with a heat dissipation device 300 such as shown in FIG. 7A that is thermally coupled to the FESS, more particularly the support structure 212 thereof, and to a specific form of a remote heat sink 402a, which is atmosphere. More particularly, there is shown a specific application where the FESS 200 is disposed below grade 10 (i.e., underground) and where the heat dissipating member 320 of the heat dissipation device 300 is located above grade (i.e., above-ground) more specifically in an end user's cabinet 50. Reference shall be made to the foregoing discussion for FIGS. 7A–B and FIG. 2 for details, features and embodiments of the FESS and the heat dissipation device 300.

Although the FESS is shown as being below grade in the foregoing discussion of FIGS. 5C and 7C, and the corresponding heat dissipating member is shown as being above-grade, this shall not be considered a limitation on the use and arrangements of the present invention. It is within the scope of the present invention for the FESS to be located above-grade and for the heat dissipating member to be disposed below grade, for example in a body of water. It also is within the scope of the present invention for the FESS to be located above grade within a structure designed to house the FESS and for the heat dissipating member to be located outside of this structure.

Figure 10:
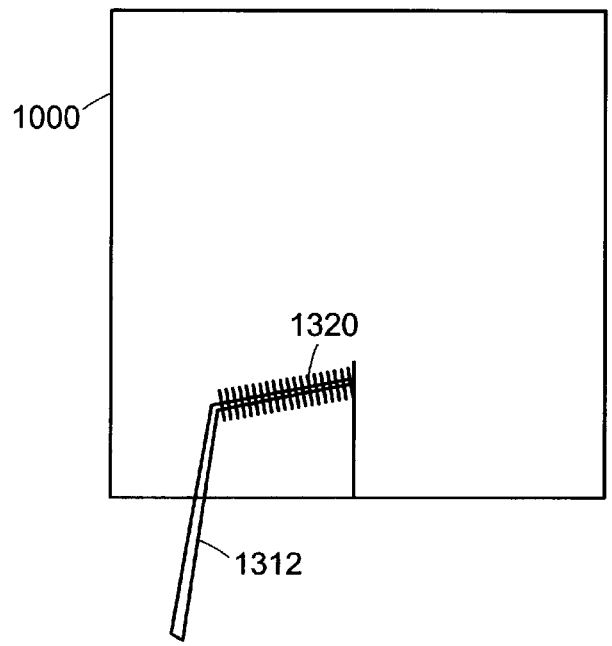
FIG. 10 is a schematic view illustrating one technique for using the heat dissipating member as a source of useable heat energy.
Figure 11:
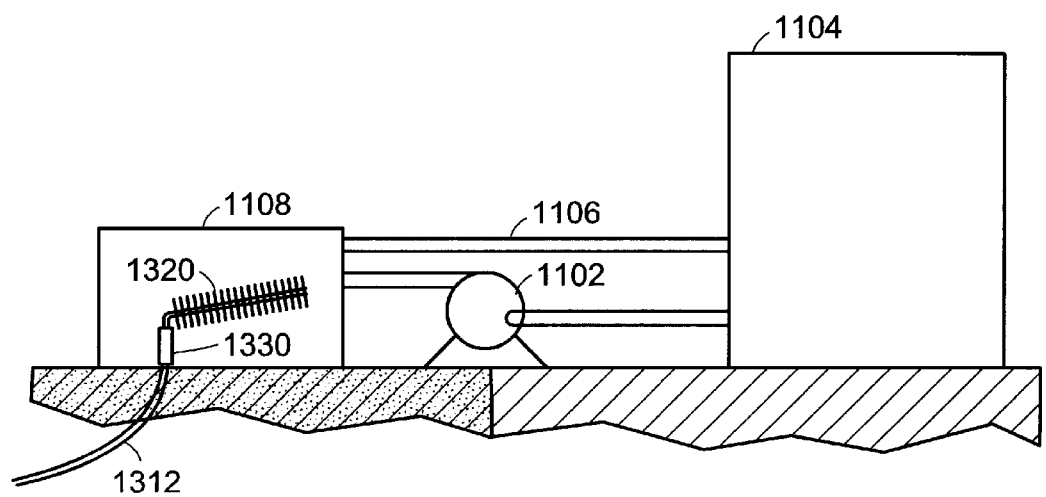
FIG. 11 is a schematic view illustrating another technique for using the heat dissipating member as a source of useable heat energy.

Now referring to FIGS. 10–11 there is shown a schematic view illustrating various techniques for utilizing a heat dissipating member 1320 as a source of useable heat energy. According to one technique as illustrated in FIG. 10, the heat dissipating member 1320 is disposed in a component or structure 1000 of an existing system or apparatus such as tank or a duct line. In use, the heat energy being dissipated by the heat dissipating member 1320 is introduced into the system or apparatus so as to heat the fluid or material passing there through. For example, the heat energy could be used to preheat a fluid, fuel oil, combustion air, the incoming air or water for a heating system or pre-heating of potable water.

In the other technique, the heat dissipating member 1320 is disposed in a vessel 1108 that is in fluid communication with a component or structure 1104 of an existing system or apparatus such as tank or a duct line via interconnecting piping. In use, a pump 1102 or equivalent pumps a fluid between the vessel 1108 and the component or structure 1100. In this way, the heat energy being dissipated by the heat dissipating member 1320 is indirectly introduced into the system or apparatus so as to heat the fluid or material passing there through.

In the foregoing, various illustrative embodiments were used to describe a heat dissipating device 300 according to any of a number of embodiments of the present invention, however, the foregoing shall not be construed as limiting the present invention to the illustrated embodiments or methodologies. It is within the scope of the present invention to dissipate at least some heat energy produced by the one or more FESS heat generating components using one or more of the same type of heat dissipation devices or a combination of different types of heat dissipation devices (e.g., heat dissipation devices according to any of the above-described embodiments of the present invention).

Although a preferred embodiment of the invention has been described using specific terms, such description is for illustrative purposes only, and it is to be understood that changes and variations may be made without departing from the spirit or scope of the following claims.

What is claimed is:

1. A flywheel energy storage system comprising:
    a heat generating component;
    supporting structure thermally coupled to the heat generating component;
    a heat dissipation device, thermally coupled to the supporting structure housing and to a heat sink that is remote from the housing, hereinafter remote heat sink;
    wherein the heat dissipation device includes:
        a heat pipe member having a first end and a second end;
        a heat dissipating member thermally engaged to the heat pipe member second end and being configured to transfer heat energy therefrom to the remote heat sink;
        wherein the heat pipe member first end is configured so as to thermally engage the supporting structure such that at least a portion of heat energy generated by the heat generating component, hereinafter heat energy to be dissipated, is transferred to the heat pipe member and communicated from the first end to the second end thereof; and
        wherein a length of the heat pipe member is set so that the heat dissipating member is located in the remote heat sink, the remote heat sink being capable of receiving and conducting the heat energy to be dissipated from the heat dissipating member; and
    wherein the remote heat sink the heat dissipating member is configured to transfer heat energy to, is one of a gas and or a liquid.

2. The flywheel energy storage system of claim 1, wherein the heat dissipation device further includes a plurality of heat pipe members, and wherein the heat pipe members first ends are configured and arranged so as to be thermally engaged with the supporting structure.

3. The flywheel energy storage system of claim 2, wherein the heat dissipation device further includes a plurality of heat dissipating members, one for each of the plurality of heat pipe members, and wherein the second end of each heat pipe member thermally engages a corresponding one of the plurality of heat dissipating members.

4. The flywheel energy storage system of claim 1, further comprising a plurality of heat dissipation devices.

5. A flywheel energy storage system comprising:
    a heat generating component;
    a housing thermally coupled to the heat generating component;
    a heat dissipation device, thermally coupled to the housing and to a heat sink that is remote from the housing, hereinafter remote heat sink;
    wherein the heat dissipation device includes:
        a heat pipe member having a first end and a second end;
        a heat dissipating member thermally engaged to the heat pipe member second end and being configured to transfer heat energy therefrom to the remote heat sink;
        wherein the heat pipe member first end is configured so as to thermally engage a portion of the housing such that at least a portion of heat energy generated by the heat generating component, hereinafter heat energy to be dissipated, is transferred to the heat pipe member and communicated from the first end to the second end thereof; and
        wherein a length of the heat pipe member is set so that the heat dissipating member is located in the remote heat sink, the remote heat sink being capable of receiving and conducting the heat energy to be dissipated from the heat dissipating member; and
    wherein the remote heat sink the heat dissipating member is configured to transfer heat energy to, is one of a gas and or a liquid.

6. The flywheel energy storage system of claim 5, wherein the heat dissipation device further includes a plurality of heat pipe members, and wherein the heat pipe member first ends are configured and arranged so as to thermally engage the housing.

7. The flywheel energy storage system of claim 6, wherein the heat dissipation device further includes a plurality of heat dissipating members, one for each of the plurality of heat pipe members, and wherein the second end of each heat pipe member thermally engages a corresponding one of the plurality of heat dissipating members.

8. The flywheel energy storage system of claim 5, further comprising a plurality of heat dissipation devices.

9. A flywheel energy storage system comprising a heat generating component and a heat dissipation device, the heat dissipating including:
   a heat pipe member having a first end and a second end;
   a heat dissipating member thermally engaged to the heat pipe member second end and being configured to transfer heat energy therefrom;
   wherein the heat pipe member first end is thermally interconnected to the heat generating component such that at least a portion of heat energy generated by the component, hereinafter heat energy to be dissipated, is transferred to the heat pipe member and communicated from the first end to the second end thereof; and
   wherein a length of the heat pipe member is set so that the heat dissipating member is located in a heat sink that is remote from the flywheel energy storage system, hereinafter remote heat sink, the remote heat sink being capable of receiving and conducting the heat energy to be dissipated from the heat dissipating member.

10. The flywheel energy storage system of claim 9, wherein the heat dissipating member is configured to transfer heat energy to a heat sink that comprises one of a solid or a fluid.

11. The flywheel energy storage system of claim 10, further comprising a housing thermally interconnected to the heat generating component and wherein the heat pipe member first end is configured and arranged so as to thermally engage a portion of the housing.

12. The flywheel energy storage system of claim 9, further comprising supporting structure thermally interconnected to the heat generating component and wherein the heat pipe member first end is configured and arranged so as to thermally engage the supporting structure.

13. The flywheel energy storage system of claim 9, further comprising a plurality of heat dissipation members.

14. The flywheel energy storage system of claim 9, wherein said heat dissipation member further includes a plurality of heat pipe members.

15. The flywheel energy storage system of claim 14, wherein the heat dissipation member further includes a plurality of heat dissipating members, one for each of the plurality of heat pipe members, and wherein the second end of each heat pipe member thermally engages a corresponding one of the plurality of heat dissipating members.

16. The flywheel energy storage system of claim 14, further comprising a housing thermally interconnected to the heat generating component and wherein the first end of each heat pipe member is configured and arranged so as to thermally engage the housing.

17. The flywheel energy storage system of claim 14, further comprising supporting structure thermally interconnected to the heat generating component and wherein the first end of each heat pipe member is configured and arranged so as to be thermally engaged with the supporting structure.

18. The flywheel energy storage system of claim 14, further comprising a housing and supporting structure each of which is thermally interconnected to the heat generating component and wherein:
   the heat pipe member first end of one of the plurality of heat pipe members is thermally engaged with the housing; and
   the heat pipe member first end of another of the plurality of heat pipe members is thermally engaged with supporting structure.

19. The flywheel energy storage system of claim 10, wherein the heat dissipating member is configured to transfer heat energy therefrom to a fluid comprising one of a gas and a liquid.

20. The flywheel energy storage system of claim 19, wherein the heat dissipating member is configured to transfer heat energy therefrom to atmosphere.

21. A heat dissipation device for a flywheel energy storage system, comprising:
   a heat pipe member having a first end and a second end;
   a heat dissipating member thermally engaged to the heat pipe member second end and being configured to transfer heat energy therefrom;
   wherein the heat pipe members first end is configured and arranged so as to be thermally engaged with a portion of the flywheel energy storage system such that at least a portion of heat energy generated by components thereof, hereinafter heat energy to be dissipated, is transferred to the heat pipe member and communicated from the first end to the second end; and
   wherein a length of the heat pipe member is set so that the heat dissipating member is located in a heat sink that is remote from the flywheel energy storage system, hereinafter remote heat sink, the remote heat sink being capable of receiving and conducting the heat energy to be dissipated from the heat dissipating member.

22. The heat dissipation device of claim 21, wherein the heat dissipating member is configured to transfer heat energy to a heat sink that is one of a solid or a fluid.

23. The heat dissipation device of claim 21, wherein the heat pipe member first end is configured and arranged so as to be thermally engaged with a portion of a housing of the flywheel energy storage system.

24. The heat dissipation device of claim 21, wherein the heat pipe member first end is configured and arranged so as to be thermally engaged with supporting structure of the flywheel energy storage system, the supporting structure being thermally engaged with the flywheel energy storage system heat generating components.

25. The heat dissipation device of claim 21, further comprising a plurality of heat pipe members, wherein the first ends of the plurality of heat pipe members are thermally engaged to portions of the flywheel energy storage system.

26. The heat dissipation device of claim 25, further comprising a plurality of heat dissipating members, one for each of the plurality of heat pipe members, wherein the second end of each heat pipe member thermally engages a corresponding one of the plurality of heat dissipating members.

27. The heat dissipation device of claim 25, wherein the heat pipe members first ends are configured and arranged so as to be thermally engaged with a housing of the flywheel energy storage system.

28. The heat dissipation device of claim 25, wherein the heat pipe members first ends are configured and arranged so as to be thermally engaged with supporting structure of the flywheel energy storage system, the supporting structure being thermally engaged with the flywheel energy storage system heat generating components.

29. The heat dissipation device of claim 25, wherein:
the heat pipe member first end of one of the plurality of heat pipe members is thermally engaged with a portion of a housing of the flywheel energy storage system; and
the heat pipe member first end of another of the plurality of heat pipe members is thermally engaged with supporting structure of the flywheel energy storage system, the supporting structure and the housing each being thermally engaged with the flywheel energy storage system heat generating components.

30. A heat dissipation method for dissipating at least some heat energy generated by components of a flywheel energy storage system that is positioned below grade, hereinafter heat energy to be dissipated, said heat dissipation method comprising the steps of:
providing a plurality of heat pipe members, each having a first end and a second end, and a heat dissipating member being thermally engaged with the second end of each of the plurality of heat pipe members and being configured to transfer heat energy therefrom;
thermally engaging the first end of at least one of the plurality of heat pipe members to supporting structure of the flywheel energy storage system, the supporting structure being thermally engaged with the flywheel energy storage system heat generating components, so that a portion of the heat energy to be dissipated is communicated to the first end and through the at least one of the plurality of heat pipe members;
thermally engaging the first end of at least one other of the plurality of heat pipe members to a portion of a housing of the flywheel energy storage system, the housing being thermally engaged with the flywheel energy storage system heat generating components, so that another portion of the heat energy to be dissipated is communicated to the first end and through the at least one other of the plurality of heat pipe members;
locating the heat dissipating member above grade so that the heat energy to be dissipated is transferred from the heat dissipating member to atmosphere.

31. The heat dissipation method of claim 30, wherein:
said providing includes providing a plurality of heat dissipating members;
said providing further includes:
thermally engaging the heat pipe member second end of the at least one of the plurality of heat pipe members that is thermally engaged with the supporting structure with at least one of the plurality of heat dissipating members, and
thermally engaging the heat pipe member second end of at least one other of the plurality of heat pipe members that is thermally engaged with the housing portion with at least one of the plurality of heat dissipating members; and
said locating includes locating each of the plurality of heat dissipating members above grade.

32. The heat dissipation method of claim 31, wherein first ends of the plurality of heat pipe members are thermally engaged with at least one of the housing and the supporting structure.

33. A heat dissipation method for dissipating at least some heat energy generated by components of a flywheel energy storage system that is positioned below grade, hereinafter heat energy to be dissipated, said heat dissipation method comprising the steps of:
providing a heat pipe member, having a first end and a second end, and a heat dissipating member being thermally engaged with the heat pipe member second end and being configured to transfer heat energy therefrom;
thermally engaging the heat pipe member first end to supporting structure of the flywheel energy storage system, the supporting structure being thermally engaged with the flywheel energy storage system heat generating components, so that the heat energy to be dissipated is communicated to the first end and through the heat pipe member;
locating the heat dissipating member above grade so that the heat energy to be dissipated is transferred from the heat dissipating member to atmosphere.

34. The heat dissipation method of claim 33, wherein:
said providing includes providing a plurality of heat pipe members, the second ends of which are connected to the heat dissipation member; and
said thermally engaging the first end includes thermally engaging the first end of each of the plurality of heat pipe members to one or more portions of the supporting structure.

35. The heat dissipation method of claim 33, wherein:
said providing includes providing a plurality of heat pipe members and a plurality of heat dissipating members, one for each heat pipe member;
said providing further includes thermally engaging the heat pipe member second end of each heat pipe member with each of the plurality of heat dissipating members;
said thermally engaging the first end includes thermally engaging the first end of each of the plurality of heat pipe members to one or more portions of the supporting structure; and
said locating includes locating each of the plurality of heat dissipating members above grade.

36. A heat dissipation method for dissipating at least some heat energy generated by components of a flywheel energy storage system that is positioned below grade, hereinafter heat energy to be dissipated, said heat dissipation method comprising the steps of:
providing a heat pipe member, having a first end and a second end, and a heat dissipating member being thermally engaged with the heat pipe member second end and being configured to transfer heat energy therefrom;
thermally engaging the heat pipe member first end to a portion of a housing of the flywheel energy storage system, the housing being thermally engaged with the flywheel energy storage system heat generating components, so that the heat energy to be dissipated is communicated to the first end and through the heat pipe member;
locating the heat dissipating member above grade so that the heat energy to be dissipated is transferred from the heat dissipating member to atmosphere.

37. The heat dissipation method of claim 36, wherein:
said providing includes providing a plurality of heat pipe members, the second ends of which each thermally engage the heat dissipation member; and
said thermally engaging the first end includes thermally engaging the first end of each of the plurality of heat pipe members to one or more portions of the housing.

38. The heat dissipation method of claim 36, wherein:
said providing includes providing a plurality of heat pipe members and a plurality of heat dissipating members, one for each heat pipe member;

said providing further include thermally engaging the heat pipe member second end of each heat pipe member with each of the plurality of heat dissipating members;

said thermally engaging the first end includes thermally engaging the first end of each of the plurality of heat pipe members to one or more portions of the housing; and said locating includes locating each of the plurality of heat dissipating members above grade.

39. A heat dissipation method for dissipating at least some heat energy generated by components of a flywheel energy storage system, hereinafter heat energy to be dissipated, said heat dissipation method comprising the steps of:

providing a heat pipe member, having a first end and a second end, and a heat dissipating member being thermally engaged with the heat pipe member second end and being configured to transfer heat energy therefrom;

thermally engaging the heat pipe member first end to the flywheel energy storage system so that the heat energy to be dissipated is communicated to the first end and through the heat pipe member;

locating the heat dissipating member in a heat sink remote from the flywheel energy storage system, hereinafter remote heat sink, the remote heat sink being capable of receiving and conducting the heat energy to be dissipated from the heat dissipating member.

40. The heat dissipation method of claim 39, wherein said locating includes selecting a given heat sink as the remote heat sink, the given heat sink having different heat transfer characteristics from those of a proximal heat sink that is proximal the flywheel energy storage system.

41. The heat dissipation method of claim 40, wherein the remote heat sink is one of a fluid and a solid.

42. The heat dissipation method of claim 41, wherein the fluid is one of a gas and a liquid.

43. The heat dissipation method of claim 42, wherein the remote heat sink is atmosphere.

44. The heat dissipation method of claim 39, further comprising the steps of positioning the flywheel energy storage system be below grade and wherein said locating includes locating the heat dissipating member above grade so that the heat energy to be dissipated is transferred from the heat dissipating member to atmosphere.

45. The heat dissipation method of claim 39, wherein said thermally engaging the first end includes thermally engaging the heat pipe member first end to a portion of a housing of the flywheel energy storage system, the housing being thermally engaged with the flywheel energy storage system heat generating components.

46. The heat dissipation method of claim 39, wherein said thermally engaging the first end includes thermally engaging the heat pipe member first end to supporting structure of the flywheel energy storage system, the supporting structure being thermally engaged with the flywheel energy storage system heat generating components.

47. The heat dissipation method of claim 46, wherein:

the supporting structure is disposed within a housing in which a sub-atmospheric pressure condition is maintained, wherein the heat pipe member passes through the housing; and wherein said heat dissipation method further comprises the step of forming a pressure seal between the housing and the heat pipe member where the heat pipe member passes through the housing.

48. The heat dissipation method of claim 39, wherein:

said providing includes providing a plurality of heat pipe members, the second ends of which are connected to the heat dissipation member; and said thermally engaging the first end includes thermally engaging the first end of each of the plurality of heat pipe members to the flywheel energy storage system.

49. The heat dissipation method of claim 48, wherein said locating includes selecting a given heat sink as the remote heat sink, the given heat sink having different heat transfer characteristics from those of a proximal heat sink that is proximal the flywheel energy storage system.

50. The heat dissipation method of claim 39, wherein:

said providing includes providing a plurality of heat pipe members and a plurality of heat dissipating members, one for each heat pipe member;

said providing further includes thermally engaging the heat pipe member second end of each heat pipe member with each of the plurality of heat dissipating members;

said thermally engaging the first end includes thermally engaging the first end of each of the plurality of heat pipe members to the flywheel energy storage system; and said locating includes locating each of the plurality of heat dissipating members in one or more heat sinks remote from the flywheel energy storage system.

51. The heat dissipation method of claim 50, wherein each of the one or remote heat sinks has different heat transfer characteristics from those of a proximal heat sink that is proximal the flywheel energy storage system.

52. The heat dissipation method of claim 50, wherein at least one of the plurality of heat dissipation members is located at a different spatial location than at least one other of the plurality of heat dissipation members. lurality of heat dissipation devices.

* * * * *